(12) United States Patent
Choi

(10) Patent No.: US 11,492,741 B2
(45) Date of Patent: Nov. 8, 2022

(54) ELECTRONIC DEVICE

(71) Applicant: LG ELECTRONICS INC., Seoul (KR)

(72) Inventor: Sunhwa Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 16/497,016

(22) PCT Filed: Dec. 28, 2018

(86) PCT No.: PCT/KR2018/016875
§ 371 (c)(1),
(2) Date: Sep. 24, 2019

(87) PCT Pub. No.: WO2020/138564
PCT Pub. Date: Jul. 20, 2020

(65) Prior Publication Data
US 2021/0214875 A1    Jul. 15, 2021

(51) Int. Cl.
*D06F 33/37*   (2020.01)
*G06N 20/00*   (2019.01)
*D06F 34/32*   (2020.01)
*D06F 34/18*   (2020.01)
*D06F 34/08*   (2020.01)
*G06K 9/62*    (2022.01)
*G06N 3/02*    (2006.01)
(Continued)

(52) U.S. Cl.
CPC .............. *D06F 33/37* (2020.02); *D06F 34/08* (2020.02); *D06F 34/18* (2020.02); *D06F 34/32* (2020.02); *G06K 9/6262* (2013.01); *G06N 3/02* (2013.01); *G06N 3/08* (2013.01);

*G06N 7/046* (2013.01); *G06N 20/00* (2019.01); *D06F 2101/04* (2020.02); *D06F 2103/04* (2020.02); *D06F 2103/60* (2020.02); *D06F 2105/42* (2020.02); *G05B 2219/2633* (2013.01)

(58) Field of Classification Search
CPC ...... D06F 35/18; D06F 33/37; D06F 2105/42; G06K 9/6262
See application file for complete search history.

(56) References Cited

U.S. PATENT DOCUMENTS

2014/0277751 A1* 9/2014 Fulmer ............... C11D 1/835
                                                                  700/275
2019/0003104 A1   1/2019 Shu
(Continued)

FOREIGN PATENT DOCUMENTS

KR    1994-0008599 B1    9/1994
KR    10-2005-0000095 A    1/2005
(Continued)

*Primary Examiner* — Spencer E. Bell
(74) *Attorney, Agent, or Firm* — Birch, Stewart, Kolasch & Birch, LLP

(57) ABSTRACT

An electronic device includes a camera to capture an image, and a processor to input an image acquired by photographing a detergent container into a trained model to acquire detergent information corresponding to the detergent container, and to guide an amount of detergent dispensed based on washing information corresponding to the detergent information. The trained model is a neural network trained using images of a plurality of detergent containers.

10 Claims, 16 Drawing Sheets

(51) Int. Cl.
*G06N 3/08* (2006.01)
*G06N 7/04* (2006.01)
*D06F 105/42* (2020.01)
*D06F 103/04* (2020.01)
*D06F 101/04* (2020.01)
*D06F 103/60* (2020.01)

(56) References Cited

U.S. PATENT DOCUMENTS

2020/0002874 A1* 1/2020 Kessler ................ G06K 7/1417
2020/0193112 A1* 6/2020 Pang .................... G06K 7/1439

FOREIGN PATENT DOCUMENTS

| KR | 10-2011-0033413 A | 3/2011 |
| KR | 10-2013-0020376 A | 2/2013 |
| KR | 10-1831783 B1 | 2/2018 |
| KR | 10-1869895 B1 | 6/2018 |
| KR | 10-2018-9093070 A | 8/2018 |

\* cited by examiner

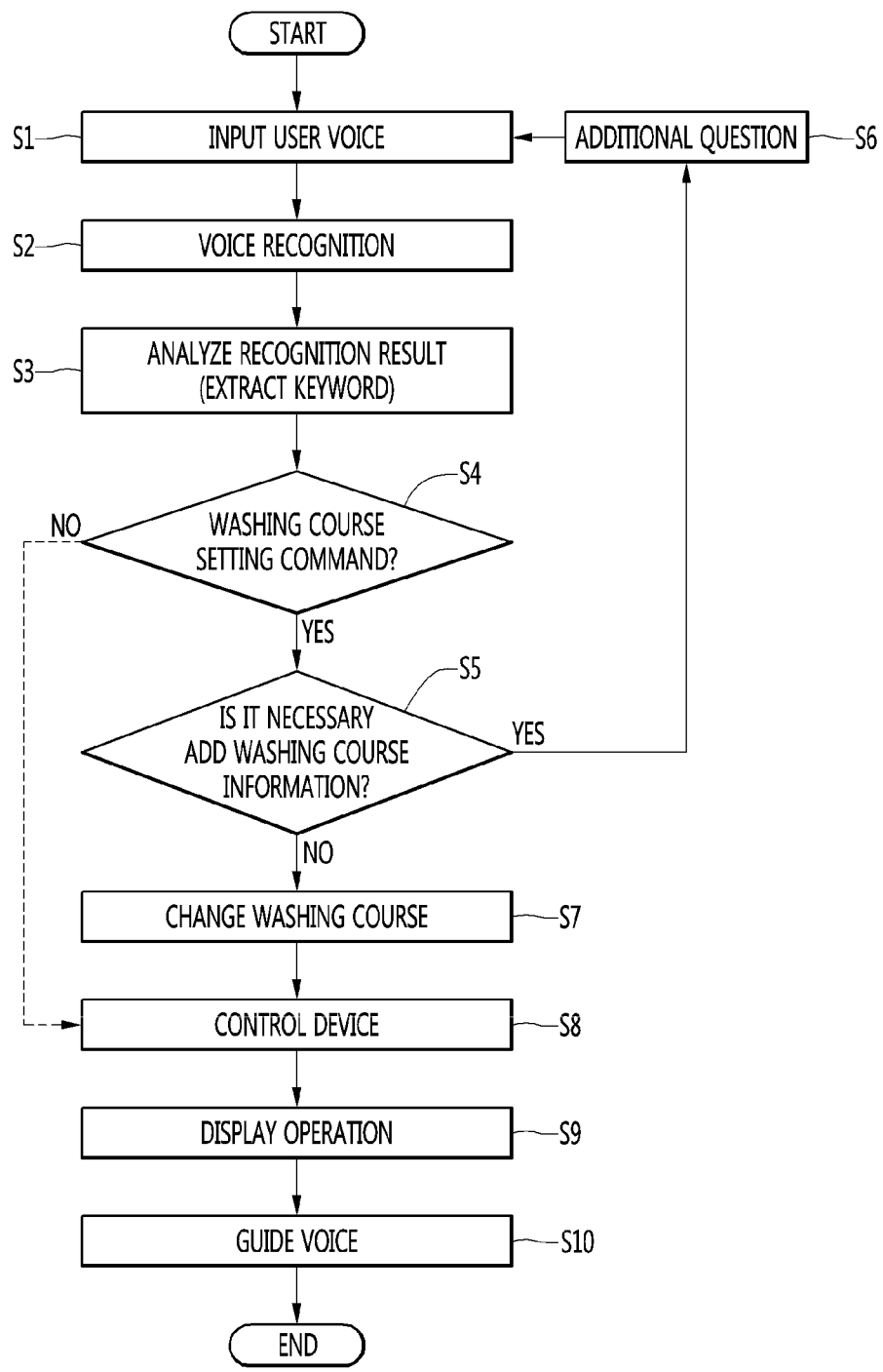

(a)

(b)

ELECTRONIC DEVICE

CROSS REFERENCE TO RELATED APPLICATIONS

This application is the National Phase of PCT/KR2018/016875 filed on Dec. 28, 2018, which is hereby expressly incorporated by reference into the present application.

BACKGROUND

The present disclosure relates to an electronic device capable of recognizing detergent information only by photographing a detergent container using an artificial intelligence technology and of guiding an amount of detergent dispensed based on the recognized detergent information.

Artificial Intelligence, which is one field in a computer science and an information technology to study and research a manner allowing a computer to perform thinking, learning, or self-developing, refers to allow the computer to emulate the intelligent behavior of a human being.

In addition, the artificial intelligence is not present in itself, but is directly/indirectly significantly associated with other fields of the computer science. Especially, recently, artificial intelligence elements have introduced into several fields of the information technology, and have been actively attempted to be utilized in solving problems in relevant fields.

Meanwhile, technologies have been actively studied and researched to perceive and learn the surrounding situation using Artificial Intelligence, to provide information desired by the user in a desired form, or to perform a desired operation or function.

Meanwhile, a detergent is used in a washing machine, and it is important to exactly calculate an amount of detergent dispensed to prevent the detergent from being wasted by preventing the detergent from being dispensed in excessively large amount and to sufficiently cleanly wash laundry by preventing the detergent from being dispensed in excessively smaller amount. In addition, Korean Unexamined Patent Publication No. 10-2005-0000095 discloses guiding a proper amount of detergent.

Meanwhile, the detergents have various characteristics depending on manufacturers, goods, product types (low/highly concentrated or general washing machine/drum washing machine). Accordingly, a proper amount of detergent may be varied depending on the type of the detergent. In Korean Unexamined Patent Publication No. 10-2005-0000095, the proper amount of detergent is guided depending on the level of water which is supplied, but proper countermeasures are failed when a different type of detergent is used.

Meanwhile, as disclosed in Korean Unexamined Patent Publication No. 10-2005-0000095, an individual character is recognized from an image captured by a camera, individual characters are combined with each other to constitute a word, and the meaning of the word is detected.

However, according to the above manner, a manner of forming a word through the recognition of the individual character and the combination of the individual characters is not exact.

In particular, the characters shown on the detergent container may be pictured or significantly variously arranged. In addition, the detergent container may be curved or crooked. Further, the angle or distance for photographing the detergent container or the lighting in photographing the detergent container may be varied. Therefore, character recognition may not be utilized in detecting the type of the detergent by photographing the detergent container.

SUMMARY

In order to accomplish the above problem, the present disclosure is to provide an electronic device capable of recognizing detergent information only by photographing a detergent container through an artificial intelligence technology and of guiding an amount of detergent dispensed based on the detergent information.

According to an embodiment of the present disclosure, an image acquired by photographing a detergent container is input into a neural network trained using images of a plurality of detergent containers, thereby acquiring detergent information corresponding to the detergent container, and guiding an amount of detergent dispensed based on the acquired detergent information.

The images of the plurality of detergent containers used for the training of the neural network are different from each other in at least one of a type of a relevant detergent, an angle of each image, brightness of each image, a distance, or a blur.

The text labeled on the image may include at least one of a trademark, a product description, a product type, or a manufacture.

The identification element may be a text including one word or a text including a plurality of words and a spacing.

According to an embodiment of the present disclosure, an electronic device may output information indicating an amount of detergent dispensed using a laundry amount and washing information.

According to an embodiment of the present disclosure, an electronic device may automatically introduce a detergent by using a laundry amount and detergent information.

According to an embodiment of the present disclosure, an electronic device may receive the input of detergent information from a user and update a trained model using the detergent information input by the user, when the acquisition of the detergent information corresponding to the detergent container is failed.

According to the present disclosure, the character is handled as an image to train the neural network, thereby improving the recognition ratio of the detergent information through photographing of the detergent container. In particular, when recognizing an individual character through the OCR, the number of words to be recognized is infinite. However, according to the present disclosure, one of the limited number of detergents is predicted, so the number of labels is limited to a specific number. Accordingly, since the number of classes to be predicted by the trained model is limited, the higher recognition ratio may be ensured.

In addition, when the user personally photographs the detergent container, the angle or distance for photographing the detergent container or the lighting in photographing the detergent container may be varied. However, according to the present disclosure, since the neural network is trained by using various images in angle, brightness, distance or blur, the strong performance may be ensured.

According to the present disclosure, the neural network is trained by using various identification elements such as a trademark, a product description, a product type, or a manufacturer, the accurate of the trained model may be improved. For example, even if the user photographs only a portion of a detergent container, the detergent information may be inferred using the identification element including the photographed portion.

In addition, according to the present disclosure, since the text may be trained in the unit of one word, or may be trained in the unit of a plurality of words, the performance of the trained model may be improved. For example, when the trademark of the detergent A is 'Lavender', and the product description of detergent B is "Lavender contained", training in the unit of "Lavender contained" is advantageous to the performance of the trained model. Meanwhile, when the trademark of the detergent A is 'Rose', and the product description of detergent B is "Lavender contained", training in the unit of 'Lavender', and the unit of 'contained' is advantageous to the performance of the trained model. In this case, even if the trained model infers only the text of 'Lavender', the photographed detergent container may be predicted as being the container of detergent 'B'.

Meanwhile, according to the present disclosure, even if the user does not retrieve detergent information or memorize the detergent information, the electronic device guides the detergent information and the amount of detergent dispensed depending on the type of a detergent, thereby providing the convenience for the user.

In addition, according to the present disclosure, since the electronic device automatically dispenses a detergent by automatically adjusting an amount of detergent dispensed, the user may perform washing using a proper amount of detergent without intervening in dispensing the detergent.

According to the present disclosure, when the recognition of the detergent is failed, re-training is performed, thereby providing an advanced AI service.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 1C is a view illustrating the procedure of operating the washing machine according to an embodiment of the present disclosure.

DETAILED DESCRIPTION OF THE EMBODIMENTS

Figure 1A:
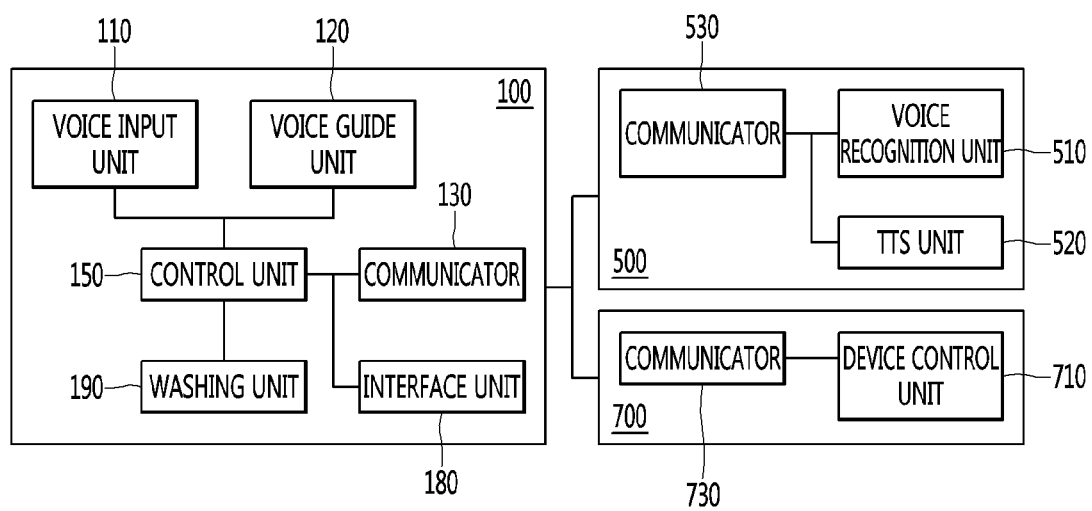
FIG. 1A is a view illustrating components of a washing machine according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The singular forms are intended to include the plural forms unless the context clearly indicates otherwise. It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, parts, and/or the combination thereof.

When the present disclosure is implemented, although components will be described by sub-dividing the components for the explanation of description, the components may be implemented in one device or module, or one component may be divided into a plurality of devices or modules to be implemented.

In the present specification, devices that perform functions necessary for washing or drying clothes, covers, or dolls or for performing dry-cleaning for the clothes, covers, or dolls are collectively referred to washing machines. In other words, in the present specification, objects, such as clothes, covers, or dolls, including cloth will be collectively referred to laundries.

FIG. 1A is a view illustrating components of a washing machine according to an embodiment of the present disclosure. FIG. 1A is a view illustrating the structure in which a washing machine performs voice recognition and course selection by using a voice server disposed at the outside.

A washing machine 100 includes a voice input unit 110, a voice guide unit 120, a communicator 130, a control unit 150, an interface unit 180, and a washing unit 190.

The washing machine 100 transmits voice data, which is input therein, to a voice server 500 such that the voice server 500 finds out the type of voice by analyzing the voice data. In addition, a central control server 700 allows a device control unit 710 to generate a control command for controlling the washing machine 100, based on the analyzed voice data and transmits the control command to the washing machine 100 through a communicator 730 such that the washing machine 100 is controlled. The interface unit 180 outputs a predetermined piece of information and provides a function of receiving a touch input or a button input, such as menu selection, which may be handled, from a user.

Hereinafter, the operations of the components will be described in more detail.

The voice input unit 110 receives an input of a voice including at least one of 'StainWord" for indicating a contaminant or 'ClothWord' for indicating a laundry from the user and generates the input in the form of voice data.

The voice input unit 110 may be a kind of a microphone. To receive only a user voice, one or more microphones are provided as one example of the voice input unit 110. The voice input unit 110, which includes one or more microphones, may include a module to remove noise. In this case, the voice input unit 110 may extract only a voice, convert the voice into voice data, and transmit the voice data to the voice server 500 through the communicator 130.

The communicator 130 transmits the voice data, which is generated based on the voice input to the voice input unit 110, and identification information of the washing machine 100 to the first server, and receives course setting information from any one of the first server or a second server distinguished from the first server.

The washing unit 190 includes components to provide a washing function. Functions, such as water supplying, water draining, washing, or rinsing, may be provided.

In this case, when the server making contact with the washing machine 100 is the voice server 500 and the central control server 700 as illustrated in FIG. 1, the first server may be the voice server 500 and the second server may be the central control server 700. In this case, the communicator 130 may receive the course setting information from the central control server 700 and may separately make communication with the voice server 500 in the case of voice recognition.

In addition, when the voice server 500 and the central control server 700 are integrated into one server, the communicator 130 may make communication with one integrated server. Using one server or a plurality of servers, dividing a server into a plurality of server or integrating a plurality of servers into one server based on functions, corresponds to various embodiments, and the present disclosure is not limited to one form.

Meanwhile, the voice recognition unit 510 of the voice server 500 recognizes a voice received therein from the washing machine 100. In this process, the voice server 500 may extract a meaningful word by performing Automatic Speech Recognition (ASR) and Natural Language Processing (NLP) with respect to voice data. In addition, the extracted word is transmitted to the central control server 700 and the central control server 700 detects a control intention of a user and remotely controls the washing machine 100.

A device control unit 710 generates a control command, or course setting information necessary for washing, which is appropriate to the control intention of the user, and transmits the control command to the washing machine 100 though a communicator 730. In this procedure, the washing machine 100 may directly perform the output through the voice guide unit 120 to execute the received control command, or wash laundry in a specific washing course. Alternatively, if a text to speech (TTS) of the voice server 500 generates voice data to be output and provides the voice data to the washing machine 100 through the communicator 530, the washing machine 100 may output the voice data received therein to guide a washing course for the user.

In summary, when the washing course is set depending on voice input by the voice input unit 110, the voice guide unit 120 may output a voice guide message to guide the washing course corresponding to the course setting information.

In this case, the course setting information may include a combination of at least one of a washing strength (Spin) of the washing machine 100, the temperature (Temperature) of water, a type of a detergent, an amount of the detergent, or the strength (soil level) of removing a contaminant of a laundry. In addition, such course setting information may be displayed on the interface unit 180 and may be selected by a user.

The interface unit 180, which is to generate an output associated with a visual, auditory, or tactile sensation, may include at least one of a display unit or a sound output unit.

The display unit displays (outputs) information processed by the washing machine. For example, the display unit may display information on an execution screen of an application run on the washing machine or information on a user interface (UI) or a graphic user interface (GUI) based on the information on the execution screen.

The display unit forms a layer structure together with a touch sensor or is integrated with the touch sensor, thereby implementing the touch screen. Such a touch screen may serve as a user input unit providing an input interface between the washing machine and the user while providing an output interface between the washing machine and the user.

The sound output unit may output audio data received from an external memory or stored in a memory. In addition, the sound output unit may output the voice of the user.

The sound output unit may include at least one of a receiver, a speaker, or a buzzer.

In addition, the control unit 150 may control such components. In particular, the control unit 150 may control the washing machine 100 such that the washing machine 100 operates based on course setting information received by the communicator 130.

When applying the configuration of the washing machine 100 of FIG. 1A, the optimal washing course of the laundry may be set through interactive voice recognition. For example, although a user does not sufficiently know the setting and the options of the washing course supported by the washing machine 100, if the user lets the washing machine to know the type of a contaminant, such as a grass stain, a coffee, or ketchup, and the type of cloth through the interactive manner, the washing machine 100 may set and recommend the optimal washing course and options.

In other words, information for setting the washing course is collected through the interactive voice recognition manner, and the optimal course provided by the washing machine is automatically set through a washing course changing process, and recommended to the user through a sound synthesizer.

Reference numerals 500 and 700 of FIG. 1A may be implemented separately from the washing machine 100 or implemented integrally into the washing machine 100. Alternatively, any one or more components constituting the voice server 500 and the central control server 700 may be included in the washing machine 100.

Figure 1B:
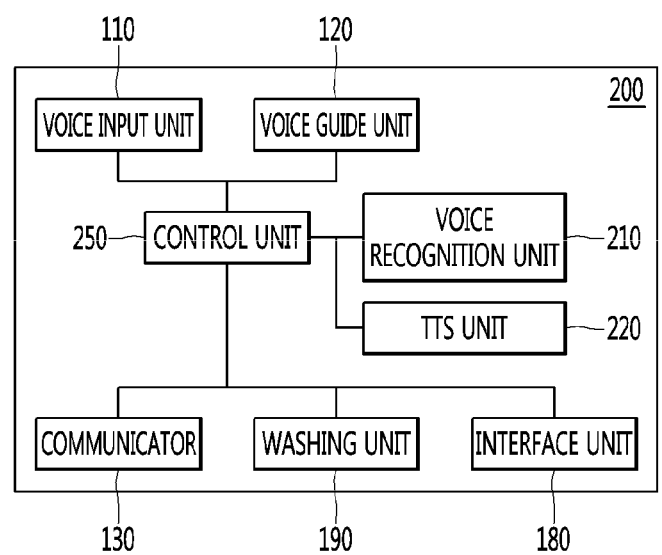
FIG. 1B is a view illustrating components when the components are integrated into a washing machine according to another embodiment of the present disclosure.

FIG. 1B is a view illustrating components when the components are integrated into a washing machine according to another embodiment of the present disclosure.

The function of the voice recognition unit 510 of the voice server 500, which has been described with reference to FIG. 1A, is provided by a voice recognition unit 210 inside a washing machine 200 as illustrated in FIG. 1B. The function of the TTS unit 520 of the voice server 500, which has been described with reference to FIG. 1A, is provided by the TTS unit 220 inside the washing machine 200. In addition, a control unit 250 of the washing machine 200 includes the function of the device control unit 710 of the central control server 700 described with reference to FIG. 1A according to a previous embodiment. The function provided by each component may be understood by making reference to the description made with reference to FIG. 1A.

FIGS. 1A and 1B may be distinguished therebetween based on whether the voice recognition and TTS functions, and a function for device controlling are included in the external server or the washing machine. Different from FIGS. 1A and 1B, only some functions may be included in the washing machine or in the server. Accordingly, the present disclosure includes various embodiments.

FIG. 1C is a view illustrating the procedure of operating the washing machine according to an embodiment of the present disclosure.

The user inputs a voice into a washing machine 100 or 200 around the washing machine 100 or 200 (S1). The input voice is converted into voice data and a voice recognition process is performed with respect to the voice data.

When considering based on the description made with reference to FIG. 1A, voice received by the voice input unit 110 of the washing machine 100 is converted into voice data to be transmitted to the voice server 500 through the communicator 130 of the washing machine 100, and the voice recognition unit 510 of the voice server 500 performs voice recognition by analyzing the voice data (S2).

When considering based on the description with reference to FIG. 1B, the voice received by the voice input unit 110 of the washing machine 200 is converted into voice data, and the voice recognition unit 210 of the washing machine 200 performs the voice recognition by analyzing the voice data (S2).

A text, which is the result of voice recognition, is generated in step S2. When the text is generated, the device control unit 710 of the central control server 700 or the control unit 250 of the washing machine 200 analyzes the user intention based on the text. The device control unit 710 or the central control server 700 or the control unit 250 of the washing machine 200 may extract a keyword appropriate to the operation of the washing machine 100 or 200 by analyzing the result based on voice recognition (S3).

The device control unit 710 or the central control server 700 or the control unit 250 of the washing machine 200 determines whether a washing course setting information command has been previously present, when the keyword is extracted (S4). If a mere device control such as the control of On/Off is issued instead of the washing course setting, the device control unit 710 or the central control server 700 or the control unit 250 of the washing machine 200 may move to step S8 and may operate corresponding to the relevant device control.

Meanwhile, if the washing course setting command has been present, the device control unit 710 or the control unit 250 determines whether information necessary for the washing course is further present, that is, whether the washing course information is additionally necessary (S5). If the washing course information is additionally necessary, the device control unit 710 or the control unit 250 controls the voice guide unit 120 to additionally ask a question (S6). Accordingly, the device control unit 710 or the control unit 250 may repeat step S1 to S5.

If the information necessary for setting the washing course is sufficiently ensured (S5), the device control unit 710 or the control unit 250 changes the washing course (S7) and controls the washing machine based on the changed washing course (S8). Thereafter, the washing machine 100 or 200 displays the description on the course to be operated, through the interface unit 180 (S9), and the voice guide unit 120 performs a voice guide for the course (S10).

Hereinafter, the operating procedure of FIG. 1C will be described.

The voice uttered by the user is converted to a text by the voice server 500 or the voice recognition unit 210, and the text is analyzed by the central control server 700 or the control unit 250 of the washing machine 200. If the text indicates a command desired for the washing course setting, an additional question for the setting of the optimal washing course is continuously asked through an interactive manner to obtain desired information. If the additional information is not necessary any more, the optimal washing course is set and recommended through a washing course changing module.

If a mere device control, such as an on/off control, is issued as in step S4, step S8, step S9, and step S10 of FIG. 1C, the device may be controlled, the controlled result may be displayed on the screen, and a feedback may be provided through a voice guide.

In FIG. 1C, step S4 may be selectively included. In addition, step S5 may be configured to repeatedly receive a predetermined number of questions. Accordingly, step S4 and step S5 may be selectively included.

Figure 1D:
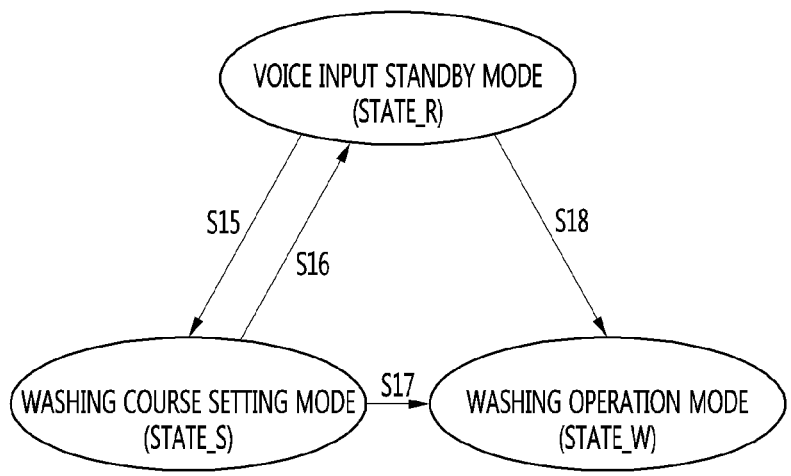
FIG. 1D is a view illustrating a transition state of a washing machine according to an embodiment of the present disclosure.

FIG. 1D is a view illustrating a transition state of a washing machine according to an embodiment of the present disclosure. The washing machine 100 or 200 suggested with reference to FIG. 1A or 1B is maintained at a voice input standby mode (STATE_R) in which the washing machine waits for a voice input, as soon as power is turned on. When a voice is input in the state that the voice input standby mode is maintained, a washing course setting mode (STATE_S) is maintained corresponding to the voice input (S15). When the information is sufficiently ensured in this procedure, the washing machine 100 or 200 performs state transition to a washing operating mode (STATE_W) (S17). However, when the information is not sufficiently ensured, state transition is performed from the washing course setting mode (STATE_S) to the voice input standby mode (STATE_R) (S16).

Alternatively, a user may control the operation of a washing machine by controlling the interface unit 180 without an additional voice input in the voice input standby mode (STATE_R) (S18).

In the situation in which it is difficult for a user to easily select the washing course, based on the above-described operation and state of the washing machine (it is difficult for the user to determine the type of washing, to select a course, or select an option, when a user inputs the feature of laundry, for example, the type of a contaminant (grass stain, coffee, or ketchup) and the type (sportswear, baby clothes, or underwear) of cloth as if the user makes conversation with the washing machine 100 or 200, the washing machine may select the optimal washing course based on the input voice data, display a recommended washing course, and guide the washing for the recommended washing course.

As described with reference to FIGS. 1C and 1D, information, such as the type of a contaminant or the type of cloth to be washed by the user, for setting the optimal washing course is acquired through questions and answers through an interactive manner, thereby setting the optimal washing course.

To this end, the user utters the type of the contaminant through a voice, and the washing machine 100 or 200 may perform a voice guide of requesting for the type of cloth, in response to the uttered voice of the user. If the user utters the type of cloth in response to the request, the washing machine may perform a voice guide of requesting for a contamination level of a contaminant. When the user utters the contamination level as a higher/middle/lower level, the washing machine may find the optimal recommendation course based on information such as input information on the contaminant or the type of cloth to be washed, or, additionally, a time point at which the cloth is contaminated, and may notify information on the optimal recommendation course to the user through a voice, thereby providing a washing course appropriate to the intention of the user.

Figure 1E:
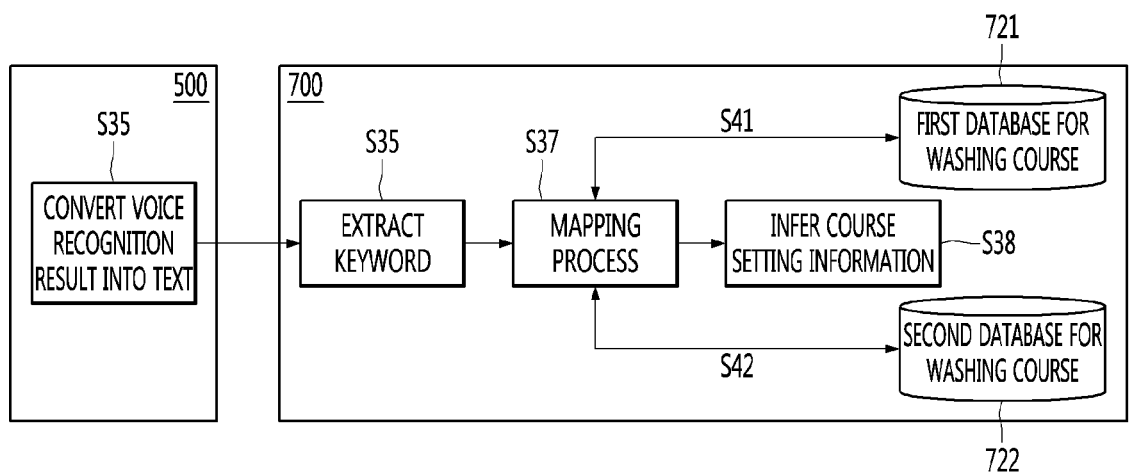
FIG. 1E is a view illustrating a process of setting a washing course based on input washing information according to an embodiment of the present disclosure.

FIG. 1E is a view illustrating a process of setting a washing course based on input washing information according to an embodiment of the present disclosure. The process of FIG. 1E may be performed by the device control unit 710 of the central control server 700 and the control unit 250 of the washing machine 200.

Hereinafter, the operation of the central control server 700 will be described with reference to FIG. 1E. As described above with reference to FIG. 1E, the device control unit 710 of the central control server 700 may retrieve, from a database, course setting information effective to a washing machine by using a first keyword corresponding to "Stain-Word", a second keyword corresponding to "ClothWord", and identification information of the washing machine. The term "StainWord" may be a word indicating the name of a contaminant, the color of the contaminant, or the chemical characteristic of the contaminant. The term "ClothWord" may include any one of the type of a laundry, a cloth name of the laundry, or the color of the laundry.

The first keyword may be identical to the StainWord, or may be a word extracted from the StainWord or a word having a specific mapping in the StainWord. Similarly, the second keyword may be identical to the ClothWord, or may be a word extracted from the ClothWord or a word having specific mapping in ClothWord.

In an embodiment, the user may utter "KET-CHA-AP" to input StainWord. In this case, the voice server 500 or the central control server 700 may presume the first keyword of "Ketchup" from the "KET-CHA-AP. According to another embodiment, the user may utter "SKK-IR-TE" to input ClothWord. In this case, the voice server 500 or the central control server 700 may presume the second keyword of "Skirt" from the "SKK-IR-TE".

In other words, according to an embodiment, StainWord or ClothWord extracted from the input voice is employed as a keyword without change. In addition, according to an embodiment, a word mapped with or extracted from StainWord or ClothWord extracted from the input voice is employed as a keyword.

The device control unit 710 retrieves, from first and second databases 721 and 722, course setting information using keywords as in suggested in FIG. 1E. The communicator 730 of the central control server 700 transmits the retrieved course setting information to the washing machine 100 such that the washing machine 100 operates based on the course setting information.

The voice server 500 of FIG. 1E recognizes an input voice and converts voice data into a text. Data (for example, a text file) on the converted text is transmitted to the central control server 700 and the device control unit 710 of the central control server 700 extracts a keyword based on a device (washing machine) in which the voice is input (S36). This is necessary for the central control server 700 to extract a keyword appropriate to a relevant device when the central control server 700 controls various types of devices.

The central control server 700 may retrieve a washing course corresponding to the extracted keyword. In FIG. 1E, according to an embodiment, the central control server 700 includes two databases in which information on a washing course corresponding to each keyword is stored. A first database 721 and a second database 722 store various utterance texts (the combination of keywords), which are able to be input for the washing course, in the form of a table, and have a washing course corresponding to the utterance texts which are set.

In one embodiment, the first database 721 stores information on a washing course specified for the washing machine. The first database 721 stores course information that the washing machine may provide for each specific washing machine. Therefore, in this case, the course setting information may be retrieved based on the identification information of the washing machine.

Meanwhile, the second database 722 stores information on a washing course which is not provided by the washing machine. This refers to a washing course that may be applied as a standard to all washing machines. In this case, the course setting information may be retrieved without identifying information of the washing machine, or the course setting information may be retrieved using a portion of the identification information.

In more detail, the device control unit 710 of the central control server 700 extracts a keyword and first retrieves, from the first database 721, whether there is present a washing course (a washing course, especially, provided for a relevant washing machine) specified for a washing machine by the extracted keyword and the identification information of the washing machine, as in step S41 (S37). Course setting information corresponding to the first keyword (StainWord) and the second keyword (ClothWord) is retrieved, from the first database 721, in which the course setting information is sorted corresponding to the identification information of the washing machine, In addition, when a relevant keyword is mapped with the retrieved washing course, course setting information is inferred (S38), in which the course setting information is to control the washing machine to set the relevant course. According to an embodiment, the course setting information may include the combination of at least one of a washing strength (Spin) of the washing machine 100, the temperature (Temperature) of water, a type of a detergent, an amount of the detergent, or the strength (soil level) of removing a contaminant of a laundry. In addition, when a course specified for the relevant washing machine may be selected. For example, when the washing machine has a function of "boiling" and the mapping result is "boiling", course setting information indicating "boiling" may be inferred.

Meanwhile, when there is absent a washing course, which may be mapped, in the first database 721 as a mapping process is performed in step S37, step S42 is performed. In other words, when the course setting information corresponding to the identification information of the washing machine and the first and second keywords is not retrieved in step S41, the course setting information corresponding to the first keyword and the second keyword is retrieved from the second database 722 having general-purpose course setting information. In other words, a washing course to be mapped is searched in the second database 722 (S42). Course setting information to control the washing machine to perform the found course is inferred as the search result (S38). For example, a washing manner obtained by combining a standard course with an option (rinsing, dehydrating, or a water temperature) may be inferred as the course setting information.

When the washing course to be mapped is not found in any one of the first and second database 721 and 722, a standard washing course may be set.

The course setting information may be transmitted to the washing machine, and the washing machine may output a notification that the washing machine operates corresponding to the course setting information, through a sound (voice information; TTS) or a text. For a TTS output, the TTS unit 520 of the voice server 500 may be used.

The description made with respect to FIG. 1E may be applied to the configuration of FIG. 1A. In addition, as illustrated in FIG. 1B, when the voice recognition unit 210, the control unit 250, and the TTS unit 220 are provided inside one washing machine 200, information may be exchanged between components inside the washing machine 200 without a separate communication procedure, so course setting information is inferred.

The extraction of the keyword in FIG. 1E may be performed by the central control server 700, or by the voice server 500. In addition, the central control server 700 and the voice server 500 may operate in the form of one server in which the central control server 700 and the voice server 500 are integrated with each other.

For example, the device control unit 710 may extract the first keyword and the second keyword from a text file transmitted by the washing machine 100 or the voice server 500.

When the communicator 730 of the central control server 700 receives the voice data from the washing machine 100, a separate voice recognition unit disposed in the central control server 700 converts the voice data into a text to extract the first keyword and the second keyword. According to an embodiment, the components of the voice server 500 are included in the central control server 700.

Meanwhile, when it is determined that any one of StainWord or ClothWord is not input, the device control unit 710 of the central control server 700 may generate a message for indicating the output of a guide message for requesting for the utterance of StainWord or ClothWord which is not input. When StainWord of "ketchup" is input, the device control unit 710 may generate a message for indicating the output of a guide message for determining the type of clothes so that the guide message for determining the type of clothes is output as illustrated in S26. The communicator 730 transmits the generated message to the washing machine 100 or the voice server 500 and receives the keyword from the washing machine 100 or the voice server 500. According to an embodiment, the received keyword is a keyword corresponding to any one of StainWord or ClothWord previously requested.

Figure 2A:
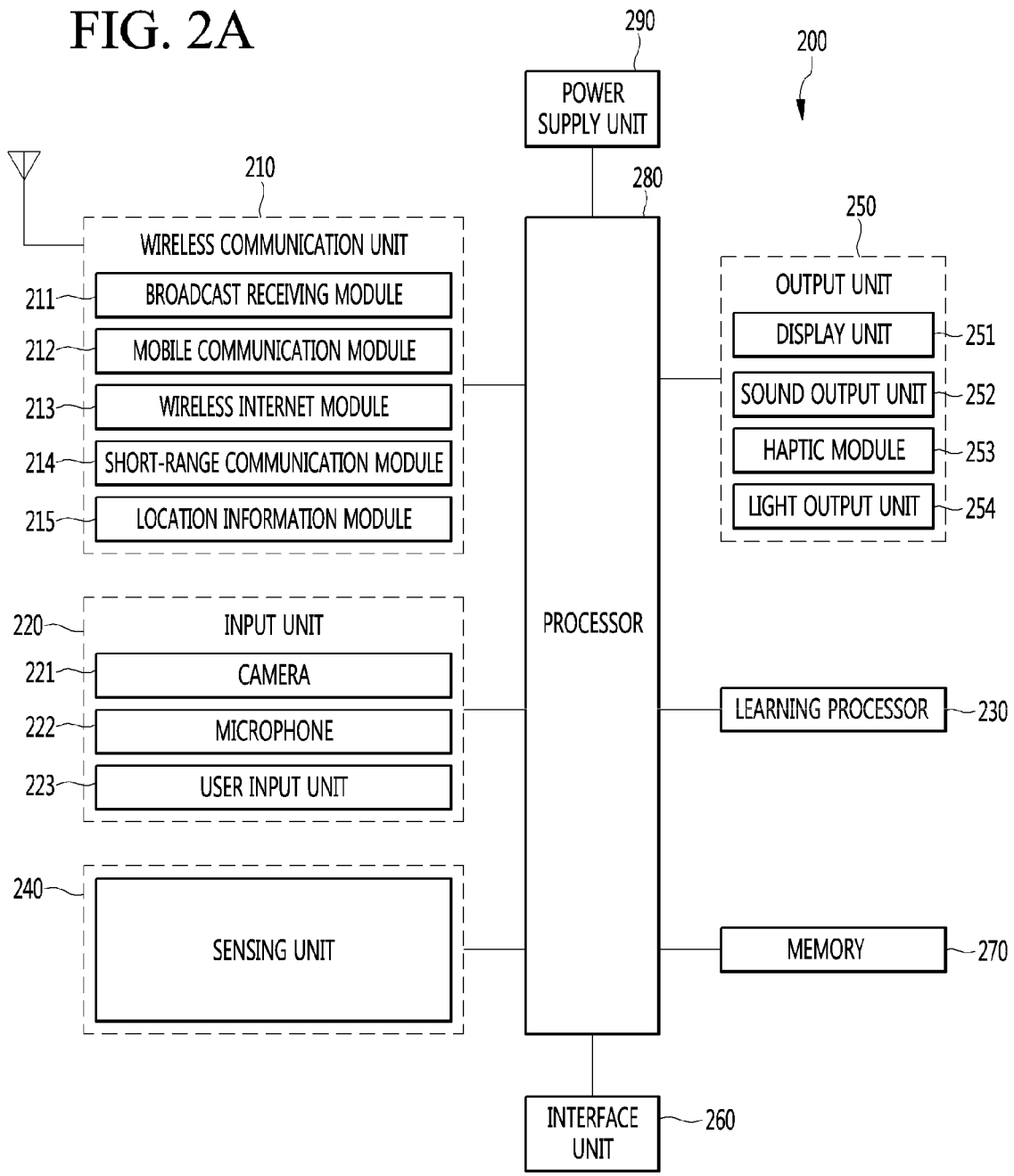
FIG. 2A is a block diagram illustrating a mobile terminal according to an embodiment of the present disclosure.

FIG. 2A is a block diagram illustrating a mobile terminal according to an embodiment of the present disclosure.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

In addition, according to an embodiment of the present disclosure, the mobile terminal 200 may be applied to a stationary robot or a movable robot.

In addition, according to an embodiment of the present disclosure, the mobile terminal 200 may perform the function of a voice agent. The voice agent may be a program to recognize the voice of the user and to output the response appropriate to the voice of the user in the form of a voice.

Referring to FIG. 1, the mobile terminal 200 may include a wireless communication unit 210, an input unit 220, a learning processor 230, a sensing unit 240, an output unit 250, an interface unit 260, a memory 270, a processor 280, and a power supply unit 290.

The wireless communication unit 210 may include at least one of a broadcast receiving module 21211, a mobile communication module 212, a wireless Internet module 213, a short-range communication module 214, or a location information module 215.

The broadcast receiving module 211 of the wireless communication unit 210 may receive a broadcast signal and/or broadcast related information from an external broadcast management server through a broadcast channel.

The mobile communication module 212 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 213 refers to a module for wireless internet access and may be built in or external to the mobile terminal 100. The wireless Internet module 213 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 213 transmits/receives data according at least one wireless internet technology including internet technology not listed above.

The short-range communication module 214 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 215 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 220 is used for inputting image information (or signal), audio information (or signal), data, or information inputted from a user and the mobile terminal 200 may include at least one camera 221 in order for inputting image information.

The camera 221 processes image frames such as a still image or a video obtained by an image sensor in a video call mode or a capturing mode. The processed image frame may be displayed on the display unit 251 or stored in the memory 270.
  stored in the memory 270.

The microphone 222 processes external sound signals as electrical voice data. The processed voice data may be utilized variously according to a function (or an application program being executed) being performed in the mobile terminal 200. Moreover, various noise canceling algorithms for removing noise occurring during the reception of external sound signals may be implemented in the microphone 222.

The user input unit 223 is to receive information from a user and when information is inputted through the user input unit 223, the processor 280 may control an operation of the mobile terminal 100 to correspond to the inputted information.

The user input unit 223 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 230 may be configured to receive, classify, store, and output information which is to be used for data mining, data analysis, intelligent decision, and machine learning algorithms.

The learning processor 230 may include at least one memory unit configured to store data received, detected, sensed, generated, previously defined, or output in various manners by the terminal, or configured to store data received, detected, sensed, generated, previously defined, or output in various manners by another component, a device, a terminal, or a device making communication with the terminal.

The learning processor 230 may include a memory which is integrated into or implemented in a terminal. In some embodiments, the learning processor 230 may be implemented with the memory 270.

Optionally or additionally, the learning processor 230 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 230 may be configured to store data in one or more databases to perform a supervised training manner, an unsupervised training manner, a data mining manner, a prediction and analyzing manner, or to identify, index, categorize, manipulate, store, search, and output data to be used in another machine.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

vmergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 280 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 210.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 210 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

The power supply unit 190 may receive external power or internal power under a control of the processor 180 and may then supply power to each component in the mobile terminal 100. The power supply unit 190 includes a battery and the battery may be a built-in battery or a replaceable battery.

Meanwhile, as described above, the processor 280 controls an operation associated with an application, typically, the overall operation of the mobile terminal 200. For example, when the state of the mobile terminal satisfies the set condition, the processor 280 may execute or release the locking state to restrict the input of a control command of a user with respect to the application.

Figure 2B:
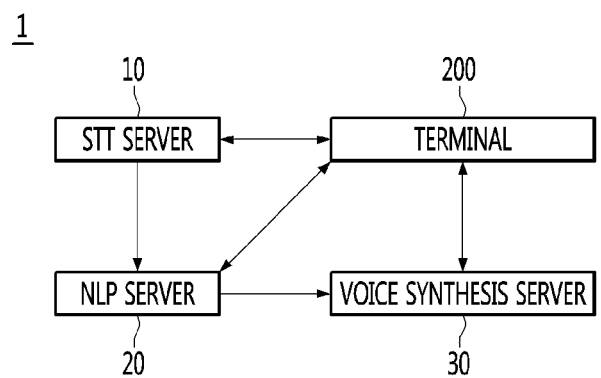
FIG. 2B is a view illustrating a voice system according to an embodiment of the present disclosure.

FIG. 2B is a view illustrating a voice system according to an embodiment of the present disclosure.

Referring to FIG. 2B, a voice system 1 may include a mobile terminal 200, a Speech To Text (STT) server 10, a Natural Language Processing (NLP) server 20, and a voice synthesis server 30.

The mobile terminal 200 may transmit voice data to the STT server 10.

The STT server 10 may convert the voice data received from the mobile terminal 200 into text data.

The STT server 10 may improve the accuracy of the voice-to-text conversion by using a language model.

The language model may refer to a model allow the calculation of a probability of a sentence or the calculation of a probability that a next word comes when previous words are given.

For example, the language model may include a probabilistic language model such as a Unigram model, a Bigram model, an N-gram model.

The unigram model is a model made on the assumption the utilization of all words is completely independent from each other. In the unigram model, the probability of a word sequence is calculated as the product of the probability of each word.

The Biagram model is a model made on the assumption that the utilization of a word depends only on a previous one word.

The N-gram model is a model made on the assumption that the utilization of the word depends on (n−1) previous words.

In other words, the STT server 10 may determine whether text data converted from the voice data is suitably converted using the language model, thereby improving the accuracy of conversion into text data.

The NLP server 20 may receive text data from the STT server 10. The NLP server 20 may perform an intention analysis on the text data based on the received text data.

The NLP server 20 may transmit intention analysis information indicating the result of the intention analysis to the mobile terminal 100.

The NLP server 20 may generate the intention analysis information by performing sequentially a morphological analysis step, a syntax analysis step, a speech act analysis step, and a dialog processing step with respect to the text data, thereby generating the intention analysis information.

According to the morphological analysis step, text data corresponding to the voice uttered by a user is classified into morpheme units, which are the smallest units having meanings, and the word class of the classified morphemes is determined.

According to the syntax analysis step, text data is classified into noun phrases, verbal phrases, or adjective phrases by using the results of the morphological analysis step, and the relationship between the classified phrases is determined.

The subject, the object, and modifiers of the voice uttered by the user may be determined.

According to the speech act analysis step, the intention of the voice uttered by the user is analyzed by using the syntax analysis step. In detail, the speech act analysis step is a step to analyze the intention of a sentence, for example, whether a user asks a question, makes a request, or merely expresses the emotion of the user.

The dialog processing step is a step to determine whether to answer to the utterance of the user, make a response to the utterance of the user, or to ask a question on additional information, based on the result of the speech act analysis step.

The NLP server 20 may generate intention analysis information including at least one of the answer or the response to the intention uttered by the user, or the additional information, after the dialog processing step.

Meanwhile, the NLP server 20 may receive text data from the mobile terminal 100. For example, when the mobile terminal 100 supports a voice text conversion function, the mobile terminal 100 may convert voice data into text data and transmit the converted text data to the NLP server 20.

The voice synthesis server 30 may combine the previously stored voice data to generate a synthesized voice.

The voice synthesis server 30 may record a voice of a person selected as a model and divide the recorded voice in a syllable or word unit. The voice synthesis server 30 may store, in an internal or external database, the voice divided in syllable or word unit.

The voice synthesis server 30 may retrieve a syllable or word corresponding to the given text data from the database and may synthesize the combination of syllables or of words, which are retrieved, to generate a synthesized voice.

The voice synthesis server 30 may store a plurality of voice language groups corresponding to each of a plurality of languages.

For example, the voice synthesis server 30 may include a first speech language group recorded in Korean, and a second speech language group recorded in English.

The voice synthesis server 30 may translate text data provided in the first language into a text provided in a second language, and may generate a synthesis voice corresponding to the translated text, using the second voice language group.

The voice synthesis server 30 may transmit the generated synthesis voice to the mobile terminal 100.

The voice synthesis server 30 may receive intention analysis information from the NLP server 20.

The voice synthesis server 30 may generate the synthesized voice in which the intention of the user is reflected, based on the intention analysis information.

In one embodiment, the STT server 10, the NLP server 20, and the voice synthesis server 30 may be implemented in the form of one server.

The functions of the STT server 10, the NLP server 20, and the voice synthesis server 30 described above may be performed by the mobile terminal 100. To this end, the mobile terminal 100 may include a plurality of processors.

The structure and function of the mobile terminal illustrated in FIGS. 2A and 2B may be implemented in the washing machine illustrated in FIGS. 1A to 1E. The structure and the function of the washing machine described with reference to FIGS. 1A to 1E may be implemented in the mobile terminal described with reference to FIGS. 2A to 2B.

Figure 3:
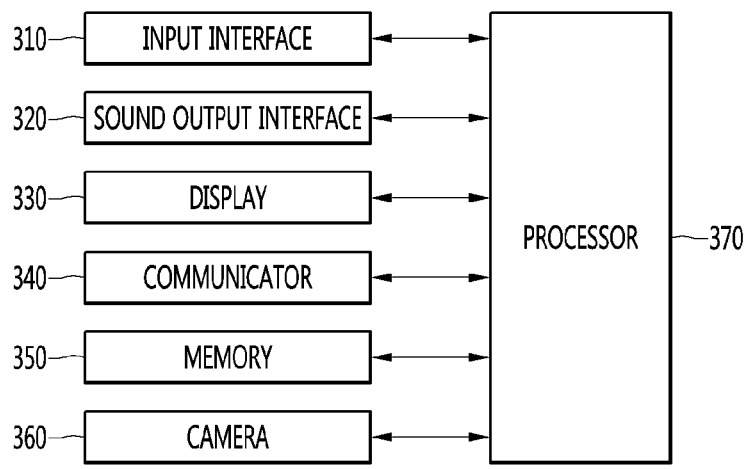
FIG. 3 is a block diagram illustrating an electronic device according to an embodiment of the present disclosure.

FIG. 3 is a block diagram illustrating an electronic device according to an embodiment of the present disclosure.

According to an embodiment of the present disclosure, the electronic device may be implemented in the washing machine described with reference to FIGS. 1A to 1E, or the mobile terminal described with reference to FIGS. 2A to 2B.

In addition, the structure and the function of the washing machine described with reference to FIGS. 1A to 1E and the structure and the function of the mobile terminal described with reference to FIGS. 2A to 2B may be applied to the electronic device 300.

The electronic device 300 may include at least one of an input interface 310, a sound output interface 320, a display 330, a communicator 340, a memory 350, or a processor 360.

The input interface 310 may include a microphone, a touch pad, or a keypad, and may receive an input from a user.

The input interface 310 may include the structure and function of at least one of a voice input unit or an interface unit described with reference to FIGS. 1A to 1E. The input interface 310 may include the structure and the function at least one of the input unit or the sensing unit described with reference to FIG. 2A.

The sound output interface 320 may include a speaker and may output a sound. The sound output interface 320 may include the structure and the function of the voice guide unit described in FIGS. 1A to 1E. In addition, the sound output interface 320 may include the structure and function of the voice output unit described with reference to FIG. 2A

The display 330 may display an image. The display 330 may include the structure and functions of the interface unit 180 illustrated in FIGS. 1A to 1E. In addition, the display 330 may include the structure and the function of the display unit described with reference to FIG. 2A.

The communicator 340 may include a communication circuit, and may make communication with another electronic device or server. The communicator 340 may include the structure and functions of the communicator described with reference to FIGS. 1A to 1E. In addition, the communicator 340 may include at least one of the wireless communicator 110 or the interface unit 160 described with reference to FIG. 2A.

The memory 350 may store data. The memory 350 may include the structure and functions of the memory described with reference to FIG. 2A.

The memory 350 may store data to support various functions of the washing machine.

In detail, the memory 350 stores a plurality of application programs or applications that are driven by the washing machine 300, data or commands for operating the washing machine, or data (for example, at least one algorithm information for machine learning) for the operation of the processor 360.

The camera 360 may capture an image. The camera 360 may include the structure and functions of the camera 121 described with reference to FIG. 2A.

The processor 360 may control the overall operation of the electronic device.

The processor 360 may include the structure and function of at least one of the control unit, the voice recognition unit, or the TTS unit described with reference to FIGS. 1A to 1E. The processor 360 may also include the structure and function of at least one of the processor or the running processor described in FIG. 2A.

The processor 360 may be used interchangeably with terms such as a controller, a control unit, a microcontroller, or a microprocessor.

The following description will be briefly made with respect to artificial intelligence.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

The ANN may be categorized into single layer neural networks and multilayer neural networks, based on the number of layers.

General single layer neural networks are configured with an input layer and an output layer.

Moreover, general multilayer neural networks are configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

An Artificial Neural Network (ANN) may be trained using training data. In this case, the training may refer to the procedure of determining an ANN parameter using training data in order to accomplish the purpose of classification, regression, or clustering for input data.

A representative example of ANN parameters may include a weight applied to a synapse and a bias applied to a neuron. This parameter may be an internal parameter and may be determined or updated by training the ANN.

For another example of the ANN parameters, there may be an activation function to generate an output value by taking a weighted sum for the number of layers, the number of neurons, the connection pattern between neurons at other layers, or an input received from a previous layer. This parameter may be an external parameter and may be set by a user.

The ANN trained using the training data may classify or cluster input data based on the pattern of the input data.

In the present specification, the ANN trained using the training data may be named a 'train model'.

Hereinafter, a method for training the ANN will be described.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

Meanwhile, the electronic device according to an embodiment of the present disclosure is equipped with a trained model which is a neural network trained by using images of a plurality of detergent containers. Accordingly, the procedure of generating the trained model provided in the electronic device will be described with reference to FIGS. 4 to 8 before the real description of the present disclosure.

Figure 4:
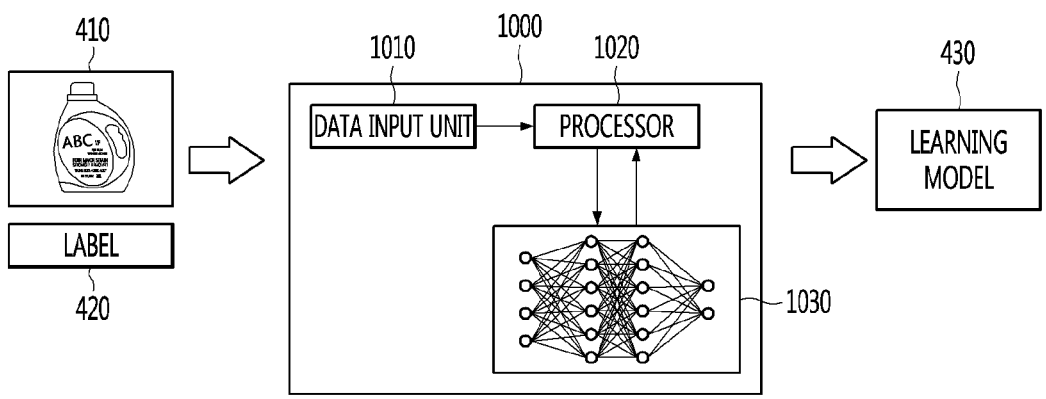
FIG. 4 is a view illustrating a training device for a neural network, according to an embodiment of the present disclosure.

FIG. 4 is a view illustrating a training device for a neural network, according to an embodiment of the present disclosure.

The training device 1000 for the neural network may include a data input unit 1010, a processor 1020, and a neural network 1030.

The data input unit 1010 may receive input data. In this case, the data input unit 1010 may receive training data and may receive data which is not processed.

When the data input unit 1010 receives the data which is not processed, the processor 1020 may preprocess the received data to generate training data that may be input to the neural network 1030.

The neural network 1030 may be implemented in hardware, software, or a combination of hardware and software. When a portion of an entire portion of the neural network is implemented in software, at least one command constituting the neural network 1030 may be stored in a memory (not illustrated) included in the training device 1000 for the neural network.

The processor 1020 may input training data or a training set into the neural network 1030 to train the neural network 1030.

In detail, the processor 1020 may determine (optimize) parameters of the ANN by repeatedly training an ANN using various training manners described above.

As described above, an ANN trained using the training data such that parameters of the ANN are determined may be referred to as a trained model in the present specification.

Meanwhile, the trained model may be used to infer a result value for new input data instead of the training data.

Meanwhile, in the present specification, images 410 of a plurality of detergent containers may be used as training data, and a text indicating "coordinate of identification element and identification element" may be input as a label 420 into the neural network together with the images 410 of the plurality of detergent containers.

Figure 5:
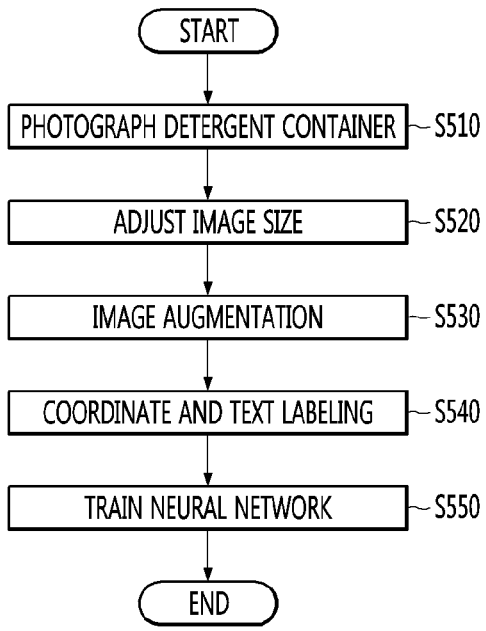
FIG. 5 is a view illustrating a method for training a neural network according to an embodiment of the present disclosure.

FIG. 5 is a view illustrating a method for training a neural network according to an embodiment of the present disclosure.

According to an embodiment of the present disclosure, a method for training the neural network may include capturing images of a plurality of detergent containers (S510), adjusting the size of the captured images (S520), performing augmentation with respect to the captured image (S530), labeling a coordinate and a text corresponding to the coordinate on each of the images of the plurality of detergent containers (S540), and training the neural network by using images of a plurality of detergent containers, the coordinate labeled on each image of the detergent containers, and the text corresponding to the coordinate (S550).

The plurality of detergent containers may be photographed in step S510.

In this case, the detergent container may refer to a case containing a detergent.

In addition, the plurality of detergent containers may refer to mutually different types of containers. In detail, the plurality of detergent containers may refer to containers of detergents different from each other in at least one of a trademark, a product type, a manufacturer, or the characteristic of a product.

For example, the plurality of detergent containers may include a container of detergent 'a' produced by manufacturer 'A', and a container of detergent 'b' produced by manufacturer 'B'. For another example, the plurality of detergent containers may include a container of detergent 'a' produced by manufacturer 'A', and a container of detergent 'c' produced by manufacturer 'A'

Meanwhile, the detergent container may be photographed by changing at least one of an angle of an image, the brightness of the image, a distance, or a blur.

In this case, the angle of the image may refer to an angle at which the detergent container is photographed. For example, the container of detergent 'a' may be photographed from the front, photographed at an angle of 10 degrees to the left from the front, or photographed at an angle of 20 degrees to the top from the front. Accordingly, images acquired by photographing one detergent container at various angles may be used as training data.

Meanwhile, brightness may refer to a bright degree (or a dark degree) due to lighting under the environment of photographing the detergent container. For example, the container of detergent 'a' may be photographed with a lower brightness under darker lighting and may be photographed with a higher brightness under brighter lighting. Accordingly, for one detergent container, images of the detergent container captured at various degrees may be used as training data.

Meanwhile, when the detergent container is photographed as a subject, the distance may refer to the distance to the subject. For example, the container of detergent 'a' may be photographed at 0.5 m from the container of the detergent 'a', and may be photographed at 1 m from the container of the detergent 'a'. Accordingly, images acquired by photographing one detergent container at various distances may be used as training data.

Meanwhile, the blur may refer to that an image is not clear as a camera is moved while being exposed to photograph the detergent container or the detergent container is not focused. Accordingly, various images having blurs may be used for training data for one detergent container.

In step S520, the size of the captured image may be adjusted. This is one of preprocesses for the training data. The captured images may be adjusted in uniform size to be input into the neural network.

In step S530, the captured image may be subject to an augmentation process. In this case, the augmentation process, which is one of preprocesses of training data, may be a work to increase an amount of training data.

In detail, the augmentation process may be a process of generating a plurality of images by changing at least one of an angle, a brightness, a distance, or a blur in the captured image.

In other words, although photographing is performed by differently setting at least one of the angle, the brightness, the distance, or the blur of the image in step S510, the present disclosure is not limited thereto. For example, the augmentation process is performed with respect to the captured image to generate a plurality of images different from each other in at least one of the angle, the brightness, the distance, or the blur.

A plurality of images of the detergent container, which are used as training data, may be different from each other, in at least one of a type of a detergent, an angle of an image, a brightness of the image, a distance, or a blur.

In other words, various types of images of the detergent container may be used as training data. Various images, which are different from each other in an angle, a brightness, a distance, or a blur, may be used as training data with respect to the same type of detergent container.

Step S540 will be described with reference to FIGS. 6 to 8.

Figure 6:
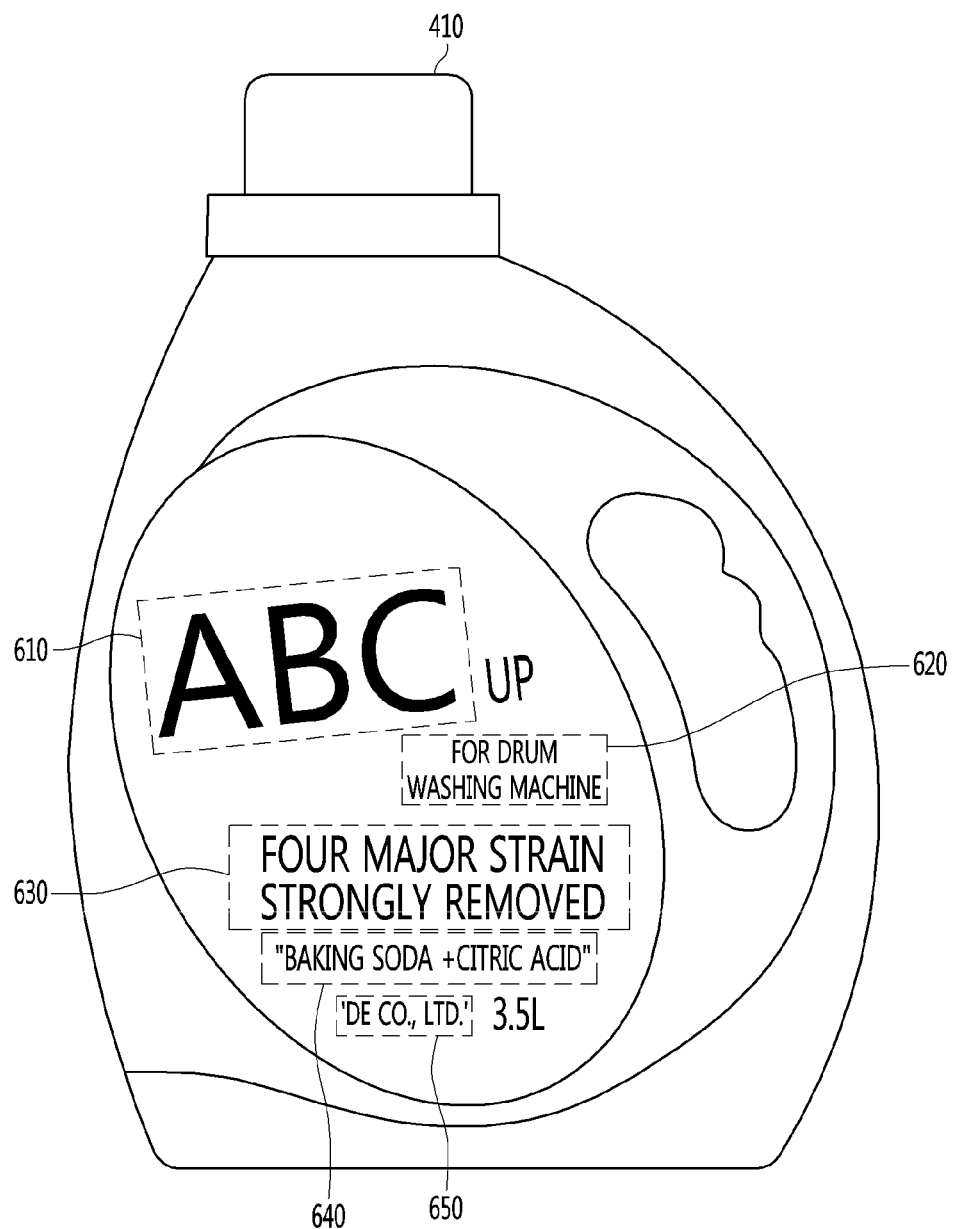
FIG. 6 is a view illustrating various identification elements on a detergent container, according to an embodiment of the present disclosure.

FIG. 6 is a view illustrating various identification elements on a detergent container, according to an embodiment of the present disclosure.

The identification element, which is marked on the detergent container, may refer to a text or an image used to identify the type of the detergent container by the processor 360 of the electronic device 300.

In detail, the identification element may include at least one of a trademark 610, product descriptions 630 and 640, a manufacturer 650, a product type 620, or an image.

In this case, the trademark may refer to an identification mark of a specific product (a specific detergent) marked on a detergent container to distinguish the specific product (specific detergent) from another product (another detergent).

The product description may refer to information marked on the detergent container to describe the characteristic or the function of a product (detergent). For example, "Four Major Strain Strongly Removed" may be information to describe the function of the detergent and "baking soda+ citric acid" may be information to describe the characteristic of the detergent.

The manufacturer 650 may refer to an identification mark of a manufacturer, which is marked on the detergent container, to distinguish between a company to manufacture or sell a specific product (specific detergent) and another company.

The product type 620 may refer to information displayed on the detergent container to identify the use or the characteristic of the detergent. For example, the product type may include "For Cloth For Baby", "For General Washing Machine", "For Drum Washing Machine", "Lower Concentration", Or "Higher Concentration".

Meanwhile, the image may refer to a picture, a pattern, or a figure marked on the detergent container.

Meanwhile, another type of detergent container may have a different identification element. In detail, another type of detergent container may be different in at least one of a trademark 610, product descriptions 630 and 640, a manufacturer 650, a product type 620, or an image.

For example, detergent 'a' and detergent 'b' are different from each other in trademark, product description, or manufacturer.

For another example, detergent 'a' and detergent 'c' may are the same in trademark, product description, or manufacturer, but may be different from each other in a product type as detergent 'a' and detergent 'c' are used for a general washing machine or a drum washing machine.

Meanwhile, a coordinate and a text corresponding to the coordinate may be labeled on each of the images of the detergent container (S540). The details thereof will be described with reference to FIG. 7.

Figure 7:
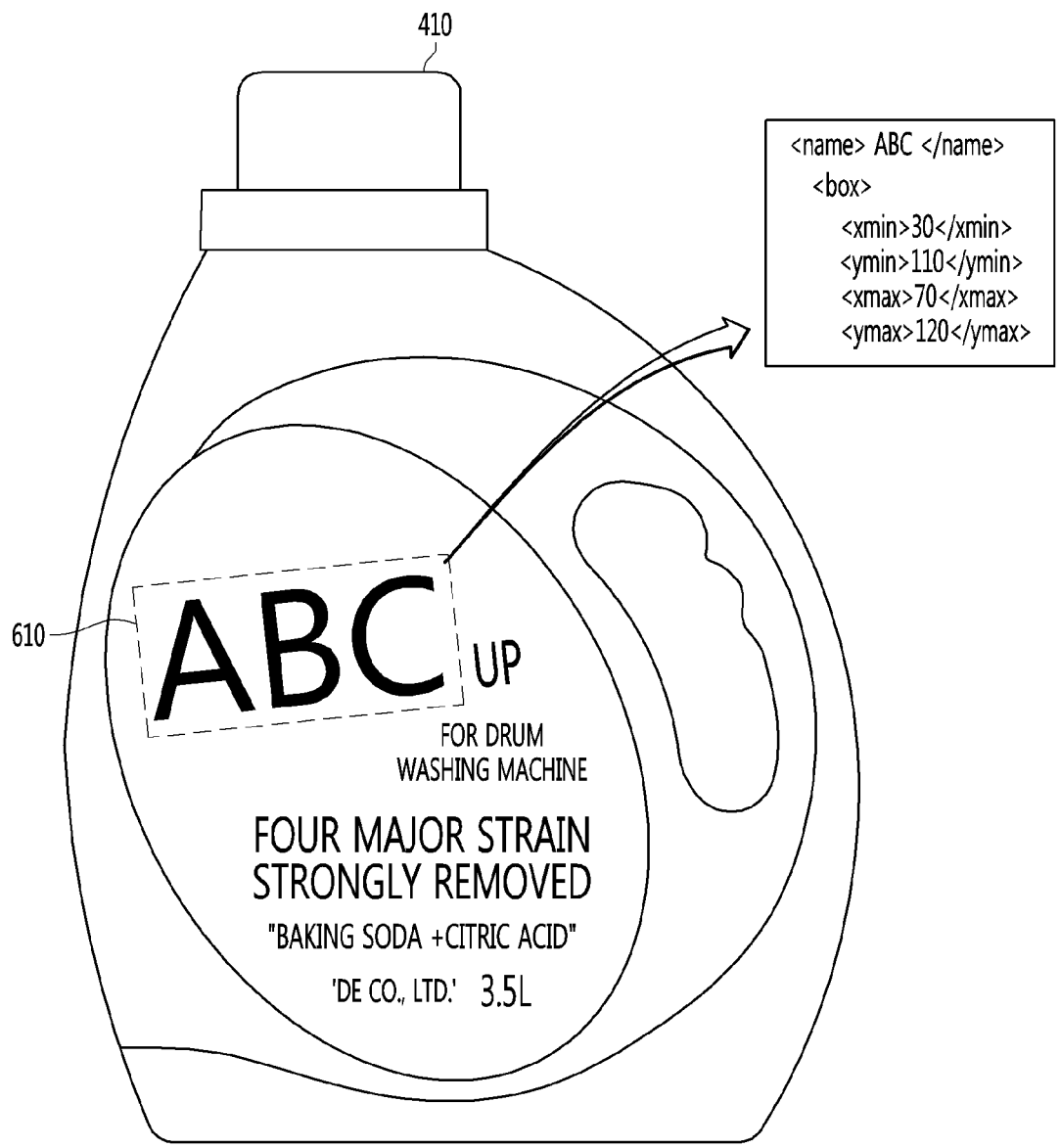
FIG. 7 is a method for labeling a coordinate and a text corresponding to the coordinate on an image according to an embodiment of the present disclosure.

FIG. 7 is a view illustrating a method for labeling a coordinate and a text corresponding to the coordinate on an image, according to an embodiment of the present disclosure.

Although a text is displayed on the product container, the neural network performs training by regarding a text displayed on a product container as an image, instead of recognizing the text itself.

Accordingly, in the present specification, a text (that is, a text having the form of an image) marked as the identification element on a product container is marked in boldface and the labeled text is described in a general typeface.

For example, an identification (trademark 610) element displayed on a detergent container 410 of FIG. 7 is marked as 'ABC' in the form of an image, and a text labeled on an image of the detergent container 410 is marked as 'ABC'.

The coordinate may be labeled on each of image of the detergent container.

For the convenience of explanation, the following description will be made on the assumption that images of a plurality of detergent containers include an image of a first type detergent container and an image of a second type detergent container, the image of the first type detergent container includes a $(1\text{-}1)^{th}$ image acquired by photographing the first type detergent container at a first angle, a $(1\text{-}2)^{th}$ image acquired by photographing the first type detergent container at the second angle, and the image of the second type detergent container includes a $(2\text{-}1)^{th}$ image acquired by photographing the second type detergent container at the first angle, and a $(2\text{-}2)^{th}$ image acquired by photographing the second type detergent container at the second angle.

Hereinafter, the $(1\text{-}1)^{th}$ image will be described by way of example.

The identification element 610 may be marked on the first type detergent container 410 and may be marked within a specific coordinate on the image.

It should be noticed that the coordinate may indicate the position of the identification element 610 on the image of the first type detergent container 410, instead of indicating the position of the identification element 610 on the first type detergent container 410.

In other words, even if images are captured for the first type detergent container 410, the positions of the identification element 610 in the images may be varied depending on a photographing angle, or a photographing distance.

Accordingly, the coordinate of the identification element 610 on the $(1\text{-}1)^{th}$ image may be labeled on the $(1\text{-}1)^{th}$ image. Identically, the coordinate of the identification element 610 on the $(1\text{-}2)^{th}$ image may be labeled on the $(1\text{-}2)^{th}$ image.

A text corresponding to the coordinate may be labeled on each of images of the detergent containers, together with the coordinate.

In detail, a text indicating the identification element present within the coordinate may be labeled on the $(1\text{-}1)^{th}$ image, while the coordinate of the identification element 610 are labeled on the $(1\text{-}1)^{th}$ image.

For example, trademark of 'ABC' (in the form of an image) is marked on the detergent container 410. In this case, a text (ABC), which indicates 'ABC', may be labeled on the $(1\text{-}1)^{th}$ image, together with the coordinate indicating 'ABC'.

In other words, one identification element on the detergent container 410 may be matched with two labels (a coordinate and a text).

Meanwhile, such a labeling procedure may be identically applied to different identification elements 620, 630, 640, and 650 within the image.

For example, on the $(1\text{-}1)^{th}$ image, the coordinate of 'Baking soda+citric acid' in the image and a text ('Baking soda+citric acid') indicating 'Baking soda+citric acid' may be labeled.

For another example, the coordinate of 'DE Co., Ltd.' within the image and the text ('DE Co., Ltd.') indicating 'DE Co., Ltd.' may be labeled on the $(1\text{-}1)^{th}$ image.

In addition, such a labeling procedure may be identically applied to images of the plurality of detergent containers used for training data.

Figure 8:
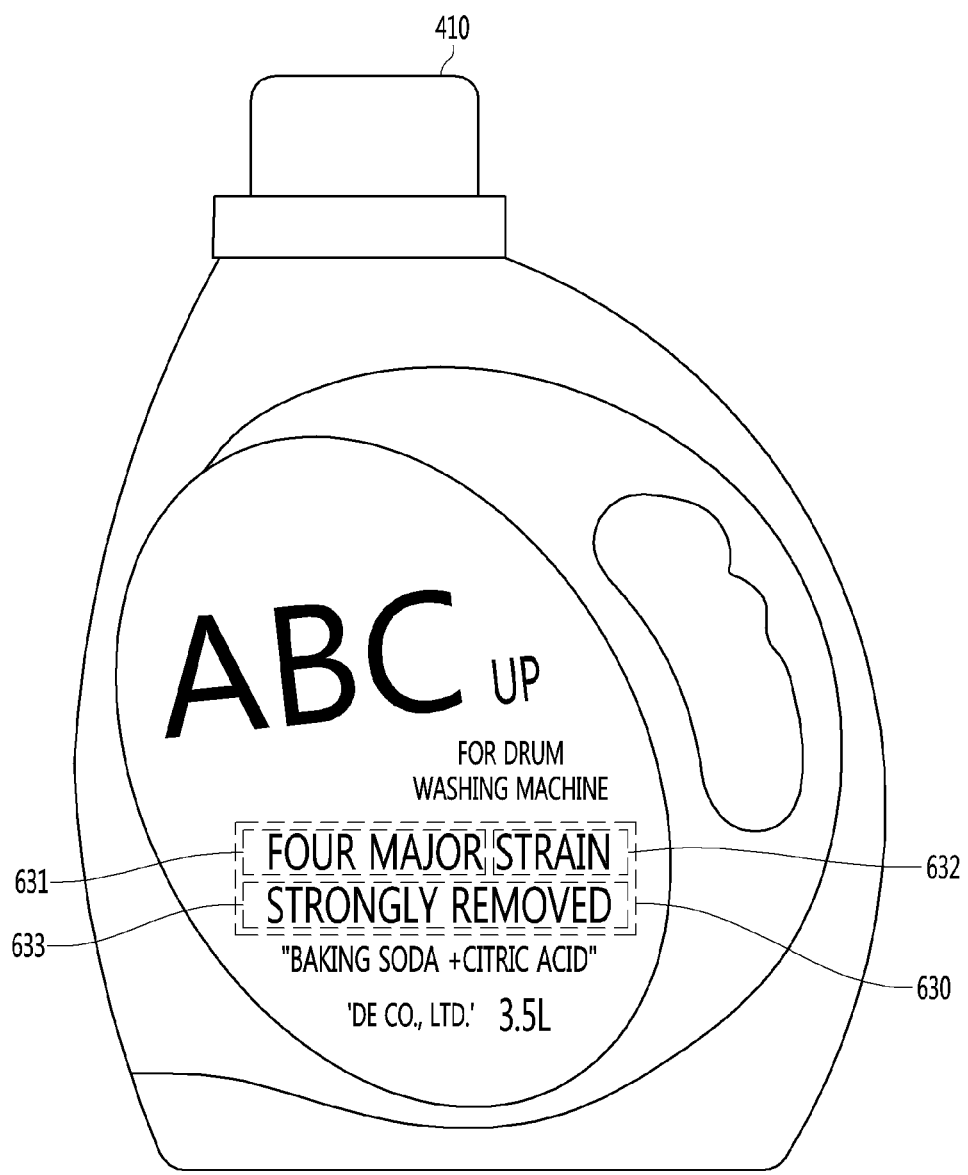
FIG. 8 is a view illustrating an identification element according to an embodiment of the present disclosure.

FIG. 8 is a view illustrating the identification element according to an embodiment of the present disclosure.

The identification element may be a text including one word. In the present specification, a word, which is formed by combining sounds to indicate a single meaning and used without spacing, may be formed by one syllable or a combination of plural syllables.

For example, a word 'Four-Major' 631, a word 'Stain' 632, and a word 'Strongly-Removed' 633 may be individual words. In this case, each of the word 'Four-Major' 631, the word 'Stain' 632, and the word 'Strongly-Removed' 633 may be used as a single identification element.

However, the present disclosure is not limited thereto. For example, the identification element may include a text including a spacing and a plurality of words.

In this case, the text including the spacing and the plurality of words may indicate one meaning through the combination of the plurality of words.

For example, the wording 'for drum washing machine' may refer to the meaning indicating the use for a drum washing machine by combining the wording 'for drum' and the wording 'washing machine".

For another example, "Four Major Strain Strongly Removed" 630 may indicate that meaning of that four types of stains are strongly removed, by combining a plurality of words, In this case, the wording 'Four Major Strain Strongly Removed' 630 may be used as one identification element.

Referring back to FIG. 5, the method for training the neural network may include training the neural network using a plurality of images of detergent containers, a coordinate labeled on each of the images of the detergent container, or a text corresponding to the coordinate.

In detail, when the images of the detergent containers, a coordinate labeled on each of the images of the detergent container, or a text corresponding to the coordinate is received through the data input unit 1010, the processor 1020 of the training device 1000 for the neural network 1030 may input the received data into the neural network 1030 to train the neural network 1030.

In this case, the processor 1020 may repeatedly train the neural network 1030 by using a supervised training manner among various training manners described above.

In this case, the neural network may infer the function of the association between training data and labeling data by using the training data (images of the detergent containers) and labeling data (coordinate and the text). In addition, the neural network may determine (optimize) parameters of the neural network through the evaluation of the inferred function.

As described above, the neural network learned using the training data (images of the detergent containers) and the labeling data (coordinate and the text) may be named a trained model.

The trained model may be provided in the electronic device 300.

Meanwhile, the trained model may be implemented in hardware, software, or the combination of hardware and software. When a portion or the entire portion of the trained model is implemented in software, at least one command constituting the trained model may be stored in the memory 350.

Hereinafter, the operation of the electronic device in which the trained model is provided will be described.

Figure 9:
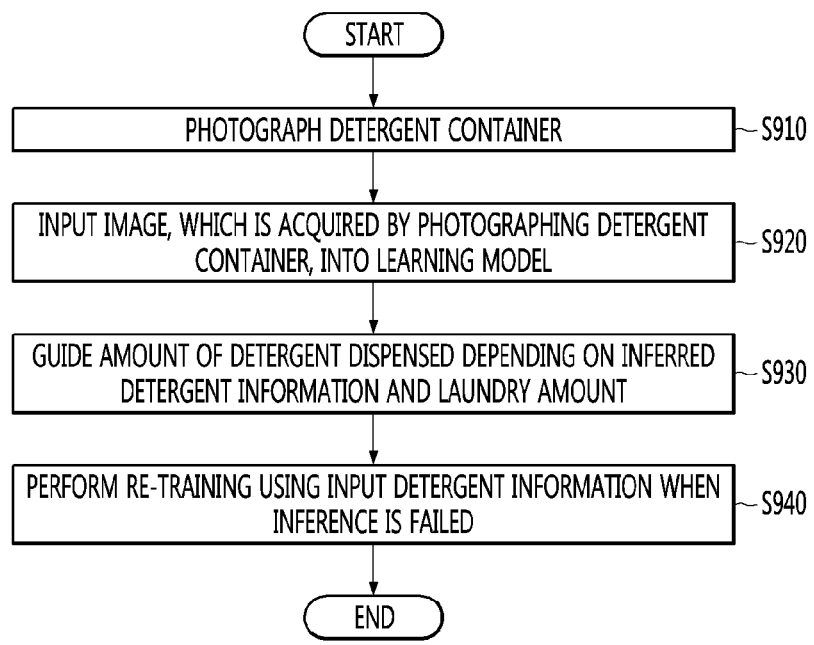
FIG. 9 is a view illustrating a method for operating an electronic device, according to an embodiment of the present disclosure.

FIG. 9 is a view illustrating a method of operating an electronic device, according to an embodiment of the present disclosure.

According to an embodiment of the present disclosure, the method of operating the electronic device may include photographing a detergent container (S910), inputting an image acquired by photographing the detergent container into a trained model (S920), acquiring detergent information by using the information inferred based on the trained model, guiding an amount of detergent dispensed based on the washing information corresponding to the detergent information (S390), and updating the trained model by using detergent information input by the user and the image acquired by photographing the detergent container when the detergent information corresponding to the detergent container fails to be acquired (S950).

The photographing of the detergent container (S910) and the inputting of the image acquired by photographing the detergent container into the trained model (S920) will be described with reference to FIG. 10.

Figure 10:
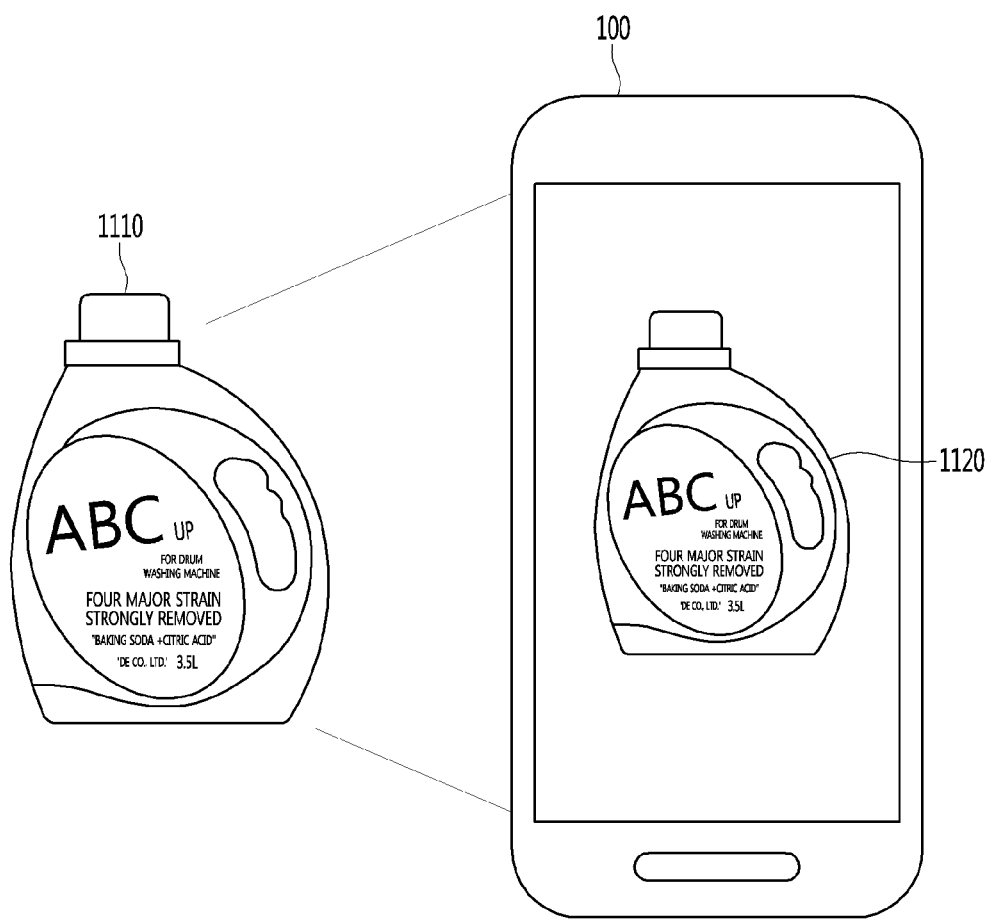
FIG. 10 is a view illustrating an image acquired by photographing the detergent container.

FIG. 10 is a view illustrating the image acquired by photographing the detergent container.

The camera 360 may photograph a detergent container 1110. Accordingly, the processor 370 may acquire an image 1120 acquired by photographing the detergent container.

Meanwhile, when the image acquired by photographing the detergent container in FIGS. 4 to 8 is an image used as training data of the neural network, an image acquired by photographing the detergent container to be described below may refer to an image captured by a user to detect the type of the detergent.

In other words, the user may photograph an image such that the camera faces the detergent container (when the electronic device is mainly a mobile terminal), or may capturing an image by moving the detergent container to the camera (when the electronic device is a washing machine).

Meanwhile, the processor 370 may input an image 1120, which is acquired by photographing the detergent container, into the trained model.

Figure 11:
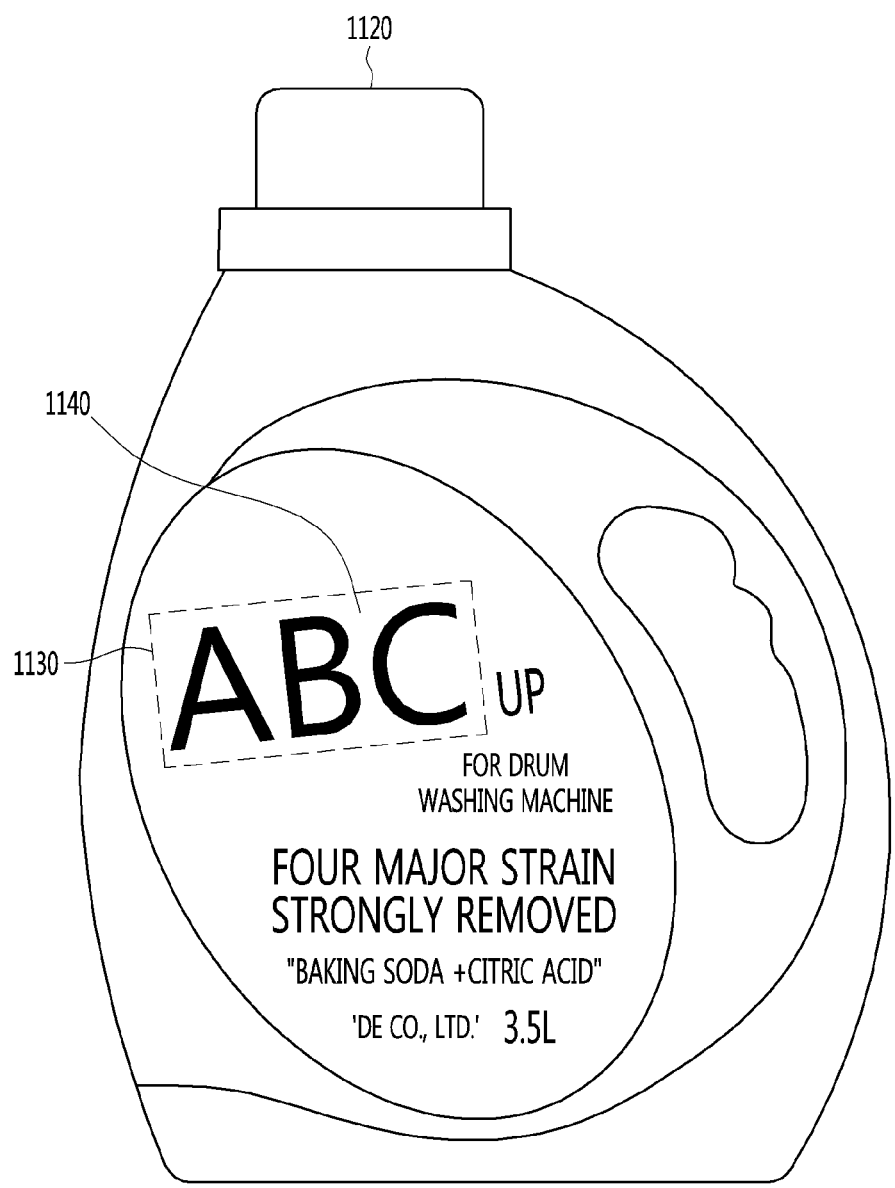
FIG. 11 is a view illustrating a method for inferring a region of interest and a text in the region of interest.

The acquiring of the detergent information by using the information inferred through the trained model and the guiding of the amount of the detergent dispensed based on the detergent information and a laundry amount (S930) will be described with reference to FIGS. 11 and 12.

The processor 370 may acquire detergent information using information inferred through the trained model.

The information inferred through the trained model may include a position of a region of interest (ROI) and a text in the ROI.

The ROI may refer to a region, in which the identification element is predicated as being present, of the image 1120 acquired by photographing the detergent container.

In detail, it has been described in the above training step that the neural network is trained based on images of the detergent containers and coordinates of the identification elements labeled on the images of the detergent container.

Accordingly, the trained model may acquire the region, in which the identification element is predicted as being present, from the image 1120, which is new input data, acquired by photographing the detergent container.

For example, the trained model may acquire a coordinate 1130, in which the identification element is predicated as being present, within the image 1120 acquired by photographing the detergent container.

Meanwhile, the text in the ROI may refer to a text of the identification element predicted as being present in the ROI.

In detail, it has been described in the above training step that the neural network is trained based on images of the detergent containers, coordinates of the identification elements labeled on the images of the detergent container, and the text corresponding to the coordinates.

Accordingly, the trained model may acquire a test of an identification element predicted as being present within the ROI, together with the region, in which the identification element is predicted as being present, from the image 1120, which is new input data, acquired by photographing the detergent container.

For example, the trained model may output a text 'ABC' of an identification element 1140 (ABC) predicated as being present in a coordinate, together with the coordinate in which the identification element is predicated as being present in the image 1120 acquired by photographing the detergent container.

Meanwhile, this procedure may be performed with respect to another element, which is included in the image 1120 acquired by photographing the detergent container. For example, the procedure may be performed even with respect to 'Four Major Strain Strongly Removed', 'Baking soda+citric acid', 'DE Co., Ltd.', or 'For Drum Washing Machine'.

Accordingly, the trained model may infer positions of a plurality of ROIs and a text corresponding to each ROI, from the image 1120 acquired by photographing the detergent container.

In this case, the text inferred by the trained model may include at least one of a trademark, a product description, a product type, or a manufacturer. In addition, when even an image is learned in addition to the text, the trained model may infer an image within the ROI.

Meanwhile, the processor 370 may acquire detergent information corresponding to the photographed detergent container by using at least one inferred text.

In detail, the memory 350 may store information representing each of a plurality of detergents.

For example, the memory 350 may store 'FGH', which is the name of a trademark, 'Lavender Contained', which is the product description, 'three-time concentration', which is the type of the product, and 'JK' which is a manufacturer, which indicates the first type detergent. In addition, the memory 350 may store 'ABC', 'Four Major Strain Strongly Removed', 'Baking soda+citric acid', 'DE Co., Ltd.', or 'For Drum Washing Machine', which indicates the second type detergent. In addition, the memory 350 may store 'ABC', 'Four Major Strain Strongly Removed', 'Baking soda+citric acid' 'DE Co., Ltd.', or 'For General Washing Machine', which indicates the third type detergent'.

In this case, the processor 370 may acquire detergent information corresponding to the photographed detergent container by using one inferred text or using some or all of a plurality of texts which are inferred.

For example, it is assumed that the memory only stores information indicating the first type detergent and information indicating the second type detergent. In this case, when the trained model infers 'ABC', which is a trademark, or infers some or all of 'ABC', 'Four Major Strain Strongly Removed', 'Baking soda+citric acid', 'DE Co., Ltd.', and 'For Drum Washing Machine', the processor 370 may determine the detergent information, which corresponds to the photographed detergent container, as being the second type detergent.

For another example, it is assumed that the memory 350 stores information indicating the first type detergent, information indicating the second type detergent, and information indicating the third type detergent. Even in this case, when the trained model has to infer 'ABC', which is a trademark, and 'For Drum Washing Machine', the processor may determine the detergent information, which corresponds to the photographed detergent container, as being the second type detergent.

Meanwhile, the processor 370 may fail to acquire the detergent information corresponding to the detergent container.

In detail, although the trained model infers 'ABC', 'Four Major Strain Strongly Removed', 'Baking soda+citric acid', 'DE Co., Ltd.', the wording 'For Drum Washing Machine' may be failed to be inferred. In this case, the processor 370 may determine whether the detergent information corresponding to the photographed detergent container is the second type detergent or the third type detergent. In this case, the processor 370 may output a message indicating that the acquisition of the detergent information is failed.

Meanwhile, as described with reference to FIG. 8, the training may be performed in the unit of a word, and may be performed in the unit formed by combining a plurality of words.

In addition, when the training is performed in the unit of a word, the processor 370 may infer a text in the unit of a word. For example, the processor 370 may infer 'Four-Major', 'Stain', or 'Strongly-Removed'.

To the contrary, when the training is performed in the unit of a text including a plurality of words and a spacing, the processor 370 may infer the text in a text unit formed by combining a plurality of words. For example, the processor 370 may infer the text of 'Four Major Strain Strongly Removed'.

Meanwhile, the processor 370 may acquire washing information corresponding to the acquired detergent information, by using the acquired detergent information.

In detail, the processor 370 may searches databases having a plurality of pieces of washing information, corresponding to the plurality of pieces of detergent information. The database may be mounted in the memory 350 or may be mounted in an additional database server. When the database is mounted in the additional database server, the processor 370 may transmit the acquired detergent information to the database server and may receive washing information corresponding to the detergent information from the database server.

In this case, the washing information may include an amount of the detergent dispensed corresponding to the detergent information, that is, an amount of the detergent dispensed that varies depending on the type of the detergent. In more detail, the washing information may include an amount of detergent dispensed for a unit laundry amount, corresponding to detergent information.

For example, when the trademark of detergent 'A' is 'a' and the type of the detergent 'A' is four-time concentration, and when the trademark of detergent 'B' is 'a' and the type of the detergent 'A' is two-time concentration, an amount of detergent dispensed, which is included in the washing information corresponding to the detergent 'A', may be twice greater than an amount of detergent dispensed, which is included in the washing information corresponding to the detergent 'B'.

Meanwhile, the processor 370 may guide the amount of detergent dispensed based on washing information and a laundry amount corresponding to the detergent information.

In this case, 'guide' may refer to that the electronic device outputs, on the display or through a voice, an amount of detergent dispensed or may automatically adjust the amount of detergent dispensed.

The details thereof will be described with reference to FIG. 12.

Figure 12:
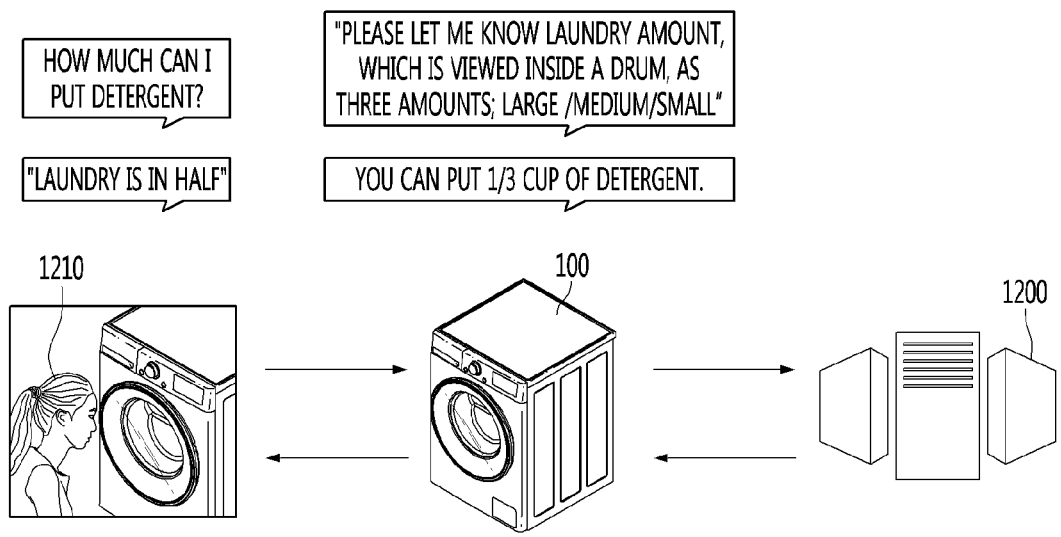
FIG. 12 is a view a method for guiding an amount of detergent dispensed, according to an embodiment of the present disclosure.

FIG. 12 is a view a method for guiding an amount of detergent dispensed, according to an embodiment of the present disclosure.

The processor 370 may receive washing information corresponding to detergent information acquired from a database server 1200.

When the question of an amount of detergent dispensed by a user is received through the input interface 310, the processor 370 may output a message for acquiring information on a laundry amount. For example, the processor 370 may display a message of "Please let me know a laundry amount, which is viewed inside a drum, as three amounts; large/medium/small, or may output the message through the voice.

In this case, the processor 370 may receive an input indicating a laundry amount through the input interface 310. For example, the processor 370 may receive a voice input of "Laundry is in half" by a user or may receive a touch input/button input indicating the laundry amount.

In this case, the processor 370 may output information indicating an amount of detergent dispensed by using a laundry amount and washing information input by a user.

In detail, the processor 370 may output an amount of detergent to be dispensed in washing, based on an amount of detergent dispensed and a laundry amount corresponding to detergent information.

For example, the processor 370 may output, through the sound output unit, a message of "You can use ⅓ cup of detergent." or may display the message on the display.

Meanwhile, when the electronic device 300 is a washing machine, the electronic device 300 may include an automatic detergent dispensing unit to automatically dispense a detergent.

In this case, the automatic detergent dispensing unit may include a detergent storage unit to store a detergent therein, a discharge port formed in the detergent storage unit to dispense the detergent stored in the detergent storage unit into a drum, a sensor to sense an amount of the detergent dispensed through the discharge port, and a driving unit to open or close the discharge port.

Meanwhile, when the detergent is dispensed through the detergent storage unit and the discharge port, the processor 370 may calculate the amount of the detergent dispensed. In addition, when the calculated amount of detergent dispensed arrives at an amount of detergent guided to be dispensed, the processor 370 may control the driving unit to close the discharge port.

Meanwhile, when the electronic device 300 is a washing machine, the electronic device may include a weight sensor to sense the weight of the laundry dispensed into the drum.

In this case, the processor 370 may calculate a laundry amount based on the weight of the laundry and may automatically dispense the detergent by using the calculated laundry amount and laundry information.

In detail, the processor 370 may open the discharge port to dispense the detergent, which is provided inside the detergent storage unit, into the drum. In addition, the processor 370 may calculate the amount of the detergent dispensed. When the calculated amount of detergent dispensed arrives at a preset amount of detergent to be dispensed, the processor 370 may control the driving unit to close the discharge port.

Meanwhile, when the detergent information corresponding to the detergent container is acquired, the processor 370 may be stored the acquired detergent information in the memory 350.

In addition, the processor 370 may guide an amount of detergent dispensed by continuously using the same detergent information as long as an additional input is not received from a user.

In detail, when the electronic device 300 is turned on after turned off, the processor 370 may guide an amount of detergent dispensed by using the detergent information stored in the memory 350.

Meanwhile, when the user changes a detergent for use to another detergent, the user may photograph another detergent using the electronic device 300.

Accordingly, when a second detergent container is photographed after the detergent information is stored in the memory 350, the processor 370 may input a trained model based on an image acquired by photographing the second detergent container.

As the image acquired by photographing the second detergent container is input into the trained model, when the second detergent information is acquired corresponding to the second detergent container, the processor 370 may store the second detergent information in the memory 350.

In this case, the processor 370 may guide an amount of detergent dispensed by continuously using the second detergent information as long as an additional input is not received from a user.

Referring back to FIG. 9, the method of operating the electronic device according to an embodiment of the present disclosure may include updating the trained model using detergent information input by a user and the image acquired by photographing the detergent container when the acquisition of the detergent information corresponding to the detergent container is failed (S950).

The details thereof will be described with reference to FIG. 13.

Figure 13:
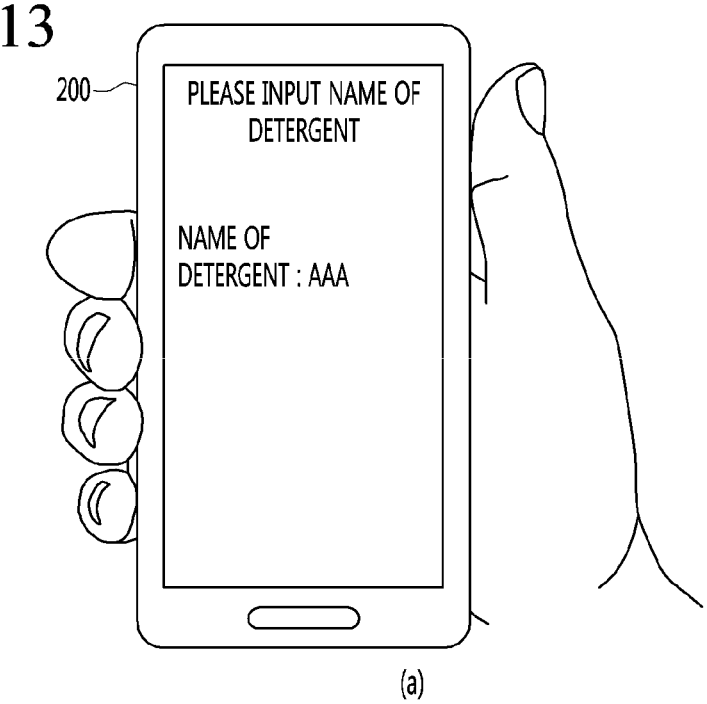
FIG. 13 is a view illustrating a method for receiving the input of the detergent information from the user when the acquisition of the detergent information is failed, according to an embodiment of the present disclosure.
Figure 13:
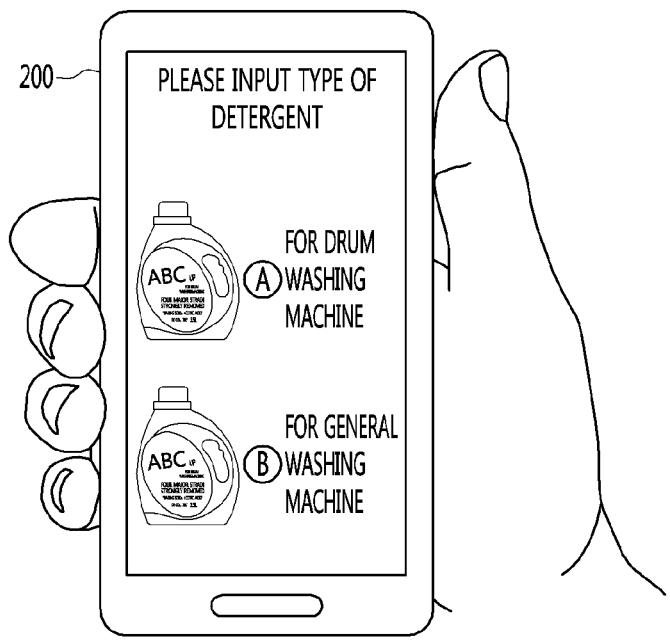

FIG. 13 is a view illustrating a method for receiving the input of the detergent information from the user when the acquisition of the detergent information is failed, according to an embodiment of the present disclosure.

In this case, the case that the acquisition of the detergent information corresponding to the detergent container is failed may refer to that the detergent information is failed to be acquired or that incorrect detergent information is acquired.

When the detergent information is failed to be acquired or an input that the acquired detergent information is incorrect is received from the user, the processor 370 may output a message of guiding the input of the detergent information.

In addition, the processor 370 may receive the input of the detergent information from the user.

In this case, as illustrated in FIG. 13, the processor 370 may receive an input of a text corresponding to an identification element, for example, the trademark of the detergent, the type of the detergent, and the manufacturer of the detergent.

Meanwhile, when the input of the detergent information is received from the user, the processor 370 may update a trained model by using detergent information input by the user and an image acquired by photographing the detergent container.

In detail, the processor 370 may re-train the neural network by inputting the detergent information input by the user and the image, which is acquired by photographing the detergent container, into the trained model. Accordingly, a new trained model may be generated as a parameter of the neural network is updated. In addition, the processor 370 may update the new trained model instead of the previous trained model Meanwhile, the trained model may be re-trained by an additional training server.

In detail, the processor 370 may transmit the detergent information input by the user and the image, which is acquired by photographing the detergent container, to a training server.

In this case, the training server may re-train the neural network by inputting the detergent information and the image input by the user, which is acquired by photographing the detergent container, into the trained model.

In this case, the training server may re-train the neural network by inputting the detergent information and the image acquired by photographing the detergent container, into the trained model, in which the detergent information and the image are received from not only the electronic device 300 but also another electronic device, into the trained model.

Meanwhile, when a new trained model is generated as the parameter of the neural network is updated, the training server may transmit the new trained model to the electronic device 300. In this case, the processor 370 may update a trained model from the previous trained model to the new trained model.

Until now, the first embodiment has been described in that the training module is generated by using data obtained by labeling the coordinate of the identification element and the text corresponding to the coordinate on the image of the detergent container and an amount of detergent dispensed is guided by using the generated trained model.

However, the present disclosure is not limited thereto. For example, a trained model may be generated by using data obtained by labeling detergent information on the image of the detergent container and an amount of detergent dispensed may be guided by using the generated trained model. This is the second embodiment.

Hereinafter, the second embodiment will be described while focusing on the difference form the first embodiment. A part, which is not described below, may be understood by making reference to the description of the first embodiment.

The detergent information may be labeled on each of images of a plurality of detergent containers.

When the images of the plurality of detergent containers and detergent information labeled on each of the images of the plurality of detergent containers are received through a data input unit 1010, a processor 1020 of a training device 1000 of a neural network inputs the received data into a neural network 1030 and trains the neural network 1030, thereby generating a trained model.

In addition, the processor 370 of the electronic device 300 may input an image acquired by photographing the detergent container into the trained model provided in the electronic device 300.

In this case, the trained model may infer detergent information from the image acquired by photographing the detergent container.

Figure 14:
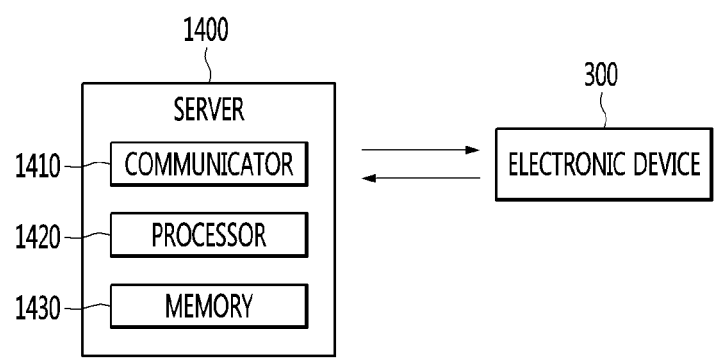
FIG. 14 is a view illustrating an embodiment in which the trained model is provided in the server.

FIG. 14 is a view illustrating an embodiment in which the trained model is provided a server 1400.

The server 1400 may include a communicator 1410 including a communication circuitry for making communication with an electronic device 300, a memory 1430 to store data for supporting various functions of the server, and a processor 1420 to control the overall operation of the server 1400.

The following description will be made while focusing on the first embodiment and the second embodiment. A part, which is not described below, may be understood by changing subjects, which performs operations, in the first and second embodiments.

The trained model may be provided in the server 1400.

Meanwhile, the trained model may be implemented in hardware, software, or the combination of hardware and software. When a portion or the entire portion of the trained model is implemented in software, at least one command constituting the trained model may be stored in the memory 1430.

When the electronic device 300 acquires the image acquired by photographing the detergent container, the electronic device 300 may transmit the image acquired by photographing the detergent container to the server 1400.

The processor 1420 of the server 1400 may receive the image acquired by photographing the detergent container from the electronic device 300.

In this case, the processor 1420 may acquire the detergent information corresponding to the detergent container by inputting the image, which is acquired by photographing the detergent container, into the trained model.

In this case, the processor 1420 may transmit the detergent information to the electronic device or may transmit the detergent information or the washing information corresponding to the detergent information to the electronic device 300.

When the detergent information is transmitted to the electronic device 300, the electronic device 300 may retrieve washing information corresponding to detergent information by searching the database, and may guide an amount of detergent dispensed based on the washing information corresponding to the detergent information and a laundry amount.

Meanwhile, the processor 1420 of the server 1400 may retrieve the washing information corresponding to the detergent information by searching the database and may transmit the detergent information and the washing information corresponding to the detergent information to the electronic device 300. In this case, the electronic device 300 may guide an amount of detergent dispensed based on the detergent information and the washing information.

Meanwhile, when the acquisition of the detergent information corresponding to the detergent container is failed, the electronic device 300 may receive an input of the detergent information from the user.

In this case, the electronic device may transmit the detergent information input by the user to the server 1400.

Meanwhile, when the detergent information input by the user is received, the processor 1420 of the server 1400 may update the trained model by using the detergent information input by the user and the image acquired by photographing the detergent container.

The recognition of the individual character by an optical character reader (OCR) may be less accurate. In particular, the characters appearing on the detergent container may be pictured or are significantly variously arranged. The detergent container is curved or crooked. In addition, an angle or a distance for photographing the detergent container or lighting in photographing the detergent container may be varied. Therefore, character recognition may not be utilized in detecting the type of the detergent by photographing the detergent container.

However, according to the present disclosure, the character is handled as an image to train the neural network, thereby improving the recognition ratio of the detergent information through photographing of the detergent container.

In particular, when recognizing an individual character through the OCR, the number of words to be recognized is infinite. However, according to the present disclosure, since one of the limited number of detergents is predicted, the number of labels is limited to a specific number. Accordingly, since the number of classes to be predicted by the trained model is limited, the higher recognition ratio may be ensured.

In addition, when the user personally photographs the detergent container, the angle or distance for photographing the detergent container or the lighting in photographing the detergent container may be varied. However, according to the present disclosure, since the neural network is trained by using various images in angle, brightness, distance or blur, the strong performance may be ensured.

In addition, according to the present disclosure, since the neural network is trained by using various identification elements such as a trademark, a product description, a product type, or a manufacturer, the accurate of the trained model may be improved. For example, even if the user photographs only a portion of a detergent container, the detergent information may be inferred using the identification element including the photographed portion.

In addition, according to the present disclosure, since the text may be trained in the unit of one word, or may be trained in the unit of a plurality of words, the performance of the trained model may be improved.

For example, when the trademark of the detergent A is 'Lavender', and the product description of detergent B is "Lavender contained", training in the unit of "Lavender contained" is advantageous to the performance of the trained model.

Meanwhile, when the trademark of the detergent A is 'Rose', and the product description of detergent B is "Lavender contained", training in the unit of 'Lavender', and the unit of 'contained' is advantageous to the performance of the trained model. In this case, even if the trained model infers only the text of 'Lavender', the photographed detergent container may be predicted as being the container of detergent 'B'.

Meanwhile, according to the present disclosure, even if the user does not retrieve detergent information or memorize the detergent information, the electronic device guides the amount of detergent dispensed depending on the type of a detergent, thereby providing the convenience for the user.

In addition, according to the present disclosure, since the electronic device automatically dispenses a detergent by automatically adjusting an amount of detergent dispensed, the user may perform washing using a proper amount of detergent without intervening in dispensing the detergent.

Further, according to the present disclosure, when the recognition of the detergent is failed, re-training is performed, thereby providing an advanced AI service.

The above-described invention is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device. In addition, the computer may include the control unit 180 of the terminal. Accordingly, the detailed description should be understood by way of example instead of being limitedly interpreted in terms of all aspects. The scope of the present disclosure should be determined by the reasonable interpretation of attached claims, and the equivalents of the present disclosure falls within the scope of the present disclosure.

What is claimed is:

1. An electronic device comprising:
 a weight sensor to sense a weight of a laundry;
 an automatic detergent dispensing unit to automatically dispense a detergent;
 a camera to capture an image of a detergent container; and
 a processor configured to:
  input the image acquired by capturing the detergent container into a trained model to acquire detergent information corresponding to the detergent container, wherein the detergent information includes a trademark, a product description, a manufacturer and a type of the detergent; and
  guide an amount of the detergent dispensed based on washing information corresponding to the type of detergent,
 wherein the trained model is a neural network trained using images of a plurality of detergent containers,
 wherein the washing information corresponding to the type of the detergent includes an amount of detergent dispensed for a unit laundry amount,
 wherein the processor is further configured to:
  acquire a laundry amount based on the weight of the laundry,
  automatically dispense the detergent, based on the laundry amount and a detergent amount dispensed for the unit laundry amount, if the detergent is recognized by the trained model, and
  output a message indicating that an acquisition of the detergent information is failed if the trained model infers the trademark, the product description and the manufacturer of the detergent and does not infer the type of the detergent,
 wherein the trained model infers a position of a region of interest and a text present in the region of interest, from the image acquired by capturing the detergent container,
 wherein the trained model is generated by training the neural network using the images of the plurality of the detergent containers and by labeling coordinates, on each image of the plurality of the detergent containers, of an identification element of the respective detergent container,
 wherein the identification element, which is present within the coordinates, is a text including at least one word, and
 wherein the labeling includes the coordinates of the identification element and the text corresponding to the coordinates.

2. The electronic device according to claim 1,
 wherein the processor is configured to:
 acquire the detergent information corresponding to the captured detergent container using one or more texts which are inferred.

3. The electronic device of claim 1, wherein the images of the plurality of detergent containers are different from each other in at least one of a type of a relevant detergent, an angle of each image, brightness of each image, a distance, or a blur of each image.

4. The electronic device of claim 1, wherein the processor is configured to:
 acquire the washing information corresponding to the detergent information by searching a database having a plurality of pieces of information corresponding to a plurality of pieces of detergent information, respectively, and
 wherein the washing information corresponding to the detergent information includes:
  the amount of the detergent dispensed corresponding to the detergent information.

5. The electronic device of claim 4, further comprising:
 an input interface to receive an input from a user;
 a sound output interface to output a voice; and
 a display to display an image,
 wherein the processor is configured to:
  receive, though the input interface, an input indicating the laundry amount; and
  output information on the amount of the detergent dispensed by using the laundry amount and the washing information.

6. The electronic device of claim 1, wherein the processor is configured to:
 receive an input of the detergent information from a user, when failing to acquire the detergent information corresponding to the detergent container; and
 update the trained model using the detergent information input by the user and the image acquired by capturing the detergent container.

7. The electronic device of claim 1, wherein the trained model is generated by training the neural network using the images of the plurality of the detergent containers and detergent information labeled on each of the images of the plurality of detergent containers.

8. The electronic device of claim 1, further comprising:
 a memory to store data,
 wherein the processor is configured to:
  store the acquired detergent information in the memory when the detergent information corresponding to the detergent container is acquired; and
  guide the amount of the detergent dispensed based on the stored detergent information, when the electronic device is turned on after turned off.

9. The electronic device of claim 8, wherein the processor is configured:
 when second detergent information corresponding to a second detergent container is acquired as an image, which is acquired by photographing the second detergent container, is input into the trained model after the acquired detergent information is stored in the memory,
 store the acquired second detergent information in the memory; and
 guide an amount of detergent using the second detergent information which is stored.

10. A method for guiding an amount of detergent dispensed, the method comprising:
 training a neutral network by using images of a plurality of detergent containers;
 photographing the detergent container;
 acquiring detergent information corresponding to the detergent container as an image acquired by photographing the detergent container is input into the neural network which is trained, wherein the detergent information includes a trademark, a product description, a manufacturer and a type of the detergent; and guiding an amount of the detergent dispensed, based on washing information corresponding to the type of detergent, wherein the washing information corresponding to the type of the detergent includes an amount of detergent dispensed for a unit laundry amount, wherein the method further comprises:
- acquiring a laundry amount based on the weight of the laundry;
- automatically dispensing the detergent, based on the laundry amount and a detergent amount dispensed for the unit laundry amount, if the detergent is recognized by the trained model; and
- outputting a message indicating that an acquisition of the detergent information is failed if the trained model infers the trademark, the product description and the manufacturer of the detergent and does not infer the type of the detergent, wherein the trained model infers a position of a region of interest and a text present in the region of interest, from the image acquired by capturing the detergent container, wherein the trained model is generated by training the neural network using the images of the plurality of the detergent containers and by labeling coordinates, on each image of the plurality of the detergent containers, of an identification element of the respective detergent container, wherein the identification element, which is present within the coordinates, is a text including at least one word, and wherein the labeling includes the coordinates of the identification element and the text corresponding to the coordinates.

* * * * *